United States Patent
Park et al.

(10) Patent No.: US 9,507,448 B2
(45) Date of Patent: Nov. 29, 2016

(54) MOBILE TERMINAL AND CONTROL METHOD THEREOF

(71) Applicant: LG ELECTRONICS INC., Seoul (KR)

(72) Inventors: Jiyoung Park, Anseong (KR); Greg Jang, Seoul (KR); Hayang Jung, Seoul (KR); Sujin Kim, Busan (KR)

(73) Assignee: LG ELECTRONICS INC., Seoul (KR)

( * ) Notice: Subject to any disclaimer, the term of this patent is extended or adjusted under 35 U.S.C. 154(b) by 98 days.

(21) Appl. No.: 13/730,010

(22) Filed: Dec. 28, 2012

(65) Prior Publication Data

US 2014/0028585 A1    Jan. 30, 2014

(30) Foreign Application Priority Data

Jul. 30, 2012    (KR) ........................ 10-2012-0083469

(51) Int. Cl.
| | |
|---|---|
| *G06F 3/048* | (2013.01) |
| *G06F 3/041* | (2006.01) |
| *G06F 3/0482* | (2013.01) |
| *G06F 3/0484* | (2013.01) |
| *G06F 3/0488* | (2013.01) |
| *H04M 1/2745* | (2006.01) |
| *H04M 1/725* | (2006.01) |

(52) U.S. Cl.
CPC ............. *G06F 3/041* (2013.01); *G06F 3/0482* (2013.01); *G06F 3/0488* (2013.01); *G06F 3/04842* (2013.01); *H04M 1/2745* (2013.01); *H04M 1/72552* (2013.01); *H04M 2250/22* (2013.01)

(58) Field of Classification Search
None
See application file for complete search history.

(56) References Cited

U.S. PATENT DOCUMENTS

| | | | | |
|---|---|---|---|---|
| 5,920,313 | A * | 7/1999 | Diedrichsen | .......... G06F 3/0481 715/767 |
| 7,971,155 | B1 * | 6/2011 | Yoon | ..................... G06F 3/0482 715/843 |
| 2007/0176922 | A1 | 8/2007 | Ikeda et al. | |
| 2008/0119237 | A1 * | 5/2008 | Kim | .............................. 455/566 |
| 2009/0193351 | A1 | 7/2009 | Lee et al. | |
| 2010/0023858 | A1 | 1/2010 | Ryu et al. | |
| 2010/0039399 | A1 * | 2/2010 | Kim | .............................. 345/173 |
| 2010/0090971 | A1 * | 4/2010 | Choi et al. | ..................... 345/173 |
| 2010/0245262 | A1 | 9/2010 | Vance et al. | |
| 2010/0295805 | A1 * | 11/2010 | Shin et al. | ..................... 345/173 |

(Continued)

FOREIGN PATENT DOCUMENTS

| | | |
|---|---|---|
| CN | 101896880 A | 11/2010 |
| CN | 101907972 A | 12/2010 |

(Continued)

*Primary Examiner* — Amr Awad
*Assistant Examiner* — Donna Lui
(74) *Attorney, Agent, or Firm* — Birch, Stewart, Kolasch & Birch, LLP

(57) ABSTRACT

The present disclosure relates to a mobile terminal, and more particularly, to a mobile terminal in which a touch input is possible and a control method thereof. A mobile terminal includes a display unit, a grouping unit and a control unit. The display unit enables a touch input thereon, and allows a plurality of objects to be displayed thereon. When a touch input for at least one of a plurality of objects is sensed, the grouping unit detects attribute information of the sensed touch input, and groups the touched object into a group corresponding to the detected attribute information. The control unit displays, on the display unit, an indicator indicating that the touched object has been grouped into the group corresponding to the detected attribute information, together with the object.

16 Claims, 17 Drawing Sheets

(56) References Cited

U.S. PATENT DOCUMENTS

| | | |
|---|---|---|
| 2010/0311445 A1 | 12/2010 | Kim |
| 2011/0009101 A1 | 1/2011 | Cho et al. |
| 2011/0084921 A1 | 4/2011 | Kang et al. |
| 2011/0099522 A1* | 4/2011 | Kim et al. .................... 715/830 |
| 2011/0219335 A1* | 9/2011 | Powers .................. G06F 3/048 715/810 |
| 2012/0264487 A1* | 10/2012 | Nomachi et al. ............. 455/563 |
| 2012/0290960 A1* | 11/2012 | Kim Yeung ........ G06F 3/04817 715/765 |
| 2013/0174089 A1* | 7/2013 | Ki ........................ G06F 3/0488 715/810 |
| 2013/0222435 A1* | 8/2013 | Choi et al. .................... 345/684 |
| 2013/0227482 A1* | 8/2013 | Thorsander et al. ......... 715/821 |
| 2013/0246975 A1* | 9/2013 | Oddiraju ............. G06F 3/04886 715/835 |

FOREIGN PATENT DOCUMENTS

| | | |
|---|---|---|
| CN | 102193714 A | 9/2011 |
| CN | 102439555 A | 5/2012 |

* cited by examiner

MOBILE TERMINAL AND CONTROL METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2012-0083469, filed on Jul. 30, 2012, the contents of which are hereby incorporated by reference in its entirety.

BACKGROUND

1. Field of the Invention

The present disclosure relates to a mobile terminal, and more particularly, to a mobile terminal in which a touch input is possible and a control method thereof.

2. Description of the Conventional Art

Terminals can be divided into mobile/portable terminals and stationary terminals according to their mobility. The portable terminals may be divided into handheld terminals and vehicle mount terminals according to whether a user directly carries his or her terminal.

As such a mobile terminal becomes multifunctional, the mobile terminal can be allowed to capture still images or moving images, play music or video files, play games, receive broadcast, etc., so as to be implemented as an integrated multimedia player. In order to support and enhance such functions of the terminal, it may be considered to improve configuration and/or software of the terminal.

With such an improvement, the terminal can display a plurality of objects. A user classifies and groups the plurality of objects for each category in order to easily find a desired object among the plurality of objects. However, in this case, the user can specify a folder in which objects is to be included by applying a touch input to a popup window related to folder specification, displayed on the display unit after selecting the objects, or can allow objects to be included in a folder by dragging the objects in the direction of the folder to be grouped. Accordingly, an error in a user input may occur in the process of user's grouping objects, i.e., the process of user's selecting a folder in which the objects is to be included.

SUMMARY

An objective of the present disclosure is to provide a mobile terminal and a control method thereof, which can efficiently group objects.

A mobile terminal according to an embodiment of the present disclosure may include a display unit configured to enable a touch input thereon, and allow a plurality of objects to be displayed thereon; a grouping unit configured to, when a touch input for at least one of a plurality of objects is sensed, detect attribute information of the sensed touch input, and group the touched object into a group corresponding to the detected attribute information; and a control unit configured to display, on the display unit, an indicator indicating that the touched object has been grouped into the group corresponding to the detected attribute information, together with the object.

According to an embodiment, the grouping unit may detect a degree of the touch input applied as the attribute information of the touch input, and the degree of the touch input applied may include at least one of a change in touch operation and a maintenance time of the touch operation from the start to the release of the touch input.

According to an embodiment, when the start of the touch input is sensed, the grouping unit may display one or more different indicators on the display unit according to the degree of the touch input applied, and group the touched object into a group corresponding to any one of the indicators has been displayed on the display unit in the release of the touch input.

According to an embodiment, when the touch input for the touched object is sensed, the grouping unit may display, on the display unit, a popup window including a plurality of indicators respectively corresponding to a plurality of groups, and group the touched object into a group corresponding to an indicator selected among the indicators.

According to an embodiment, when a first touch input for the touched object is sensed, the grouping unit may group the touched object into a group, based on attribute information of the first touch input, and, when a second touch input for the touched object is sensed, the control unit may execute at least one of an information correction mode and a delete mode of the touched object.

According to an embodiment, when a third touch input for the touched object is sensed, the control unit may display, on the display unit, a plurality of icons respectively corresponding to a plurality of functions related to the touched object, and when any one of the icons is selected, the control unit may perform a function corresponding to the selected icon.

According to an embodiment, when a fourth touch input for the grouped object is sensed, the grouping unit may release the grouping of the object or change the group in which the object is included into another group.

According to an embodiment, when a touch input for the indicator displayed together with the object is sensed, the control unit may extract objects included in a group corresponding to the touched indicator, and display the extracted objects on the display unit.

According to an embodiment, the plurality of objects may be displayed in a first screen region, and the control unit may display a plurality of indicators respectively corresponding to a plurality of groups in a second screen region different from the first screen region.

According to an embodiment, the control unit may display, in the second screen region, objects included in a group corresponding to an indicator selected among the plurality of indicators.

According to an embodiment, the control unit may select some of the plurality of groups, based on priority order information of each of the plurality of groups, and display objects included in the selected groups in the second screen region.

According to an embodiment, the control unit may display the objects included in the selected groups on a wall paper.

According to an embodiment, when an event related to any one of the plurality of objects occurs, the control unit may display, in the second screen region, at least one of the object and information on the occurring event.

According to an embodiment, the control unit may display at least one of the object and the information on the occurring event in the second screen region for a predetermined time, and when the predetermined time elapses, the second screen region may disappear on the display unit.

According to an embodiment, the control unit may display the indicator on the object or display the indicator in a place adjacent to the object.

According to an embodiment, the indicator may include an icon having a color corresponding to each of the plurality of groups.

According to an embodiment, the control unit may change at least one of the color, shape and size of the indicator, based on the touch input for the indicator.

A control method of a mobile terminal according to an embodiment of the present disclosure may include a display unit on which a touch input is possible, and a plurality of objects are displayed, includes, when a touch input for at least one of the plurality of objects is sensed, detecting attribute information of the sensed touch input; grouping the touch object into a group corresponding to the detected attribute information; and displaying, on the display unit, an indicator indicating that the touched object has been grouped into the group corresponding to the detected attribute information, together with the object.

According to an embodiment, the detecting of the attribute information of the sensed touch input may include detecting a degree of the touch input applied as the attribute information of the touch input, and the degree of the touch input applied may include at least one of a change in touch operation and a maintenance time of the touch operation from the start to the release of the touch input.

According to an embodiment, the grouping of the touched object into the group corresponding to the detected attribute information may include, when the start of the touch input is sensed, displaying one or more different indicators on the display unit according to the degree of the touch input applied; and grouping the touched object into a group corresponding to any one of the indicators has been displayed on the display unit in the release of the touch input.

BRIEF DESCRIPTION OF THE DRAWING

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION

Figure 1:
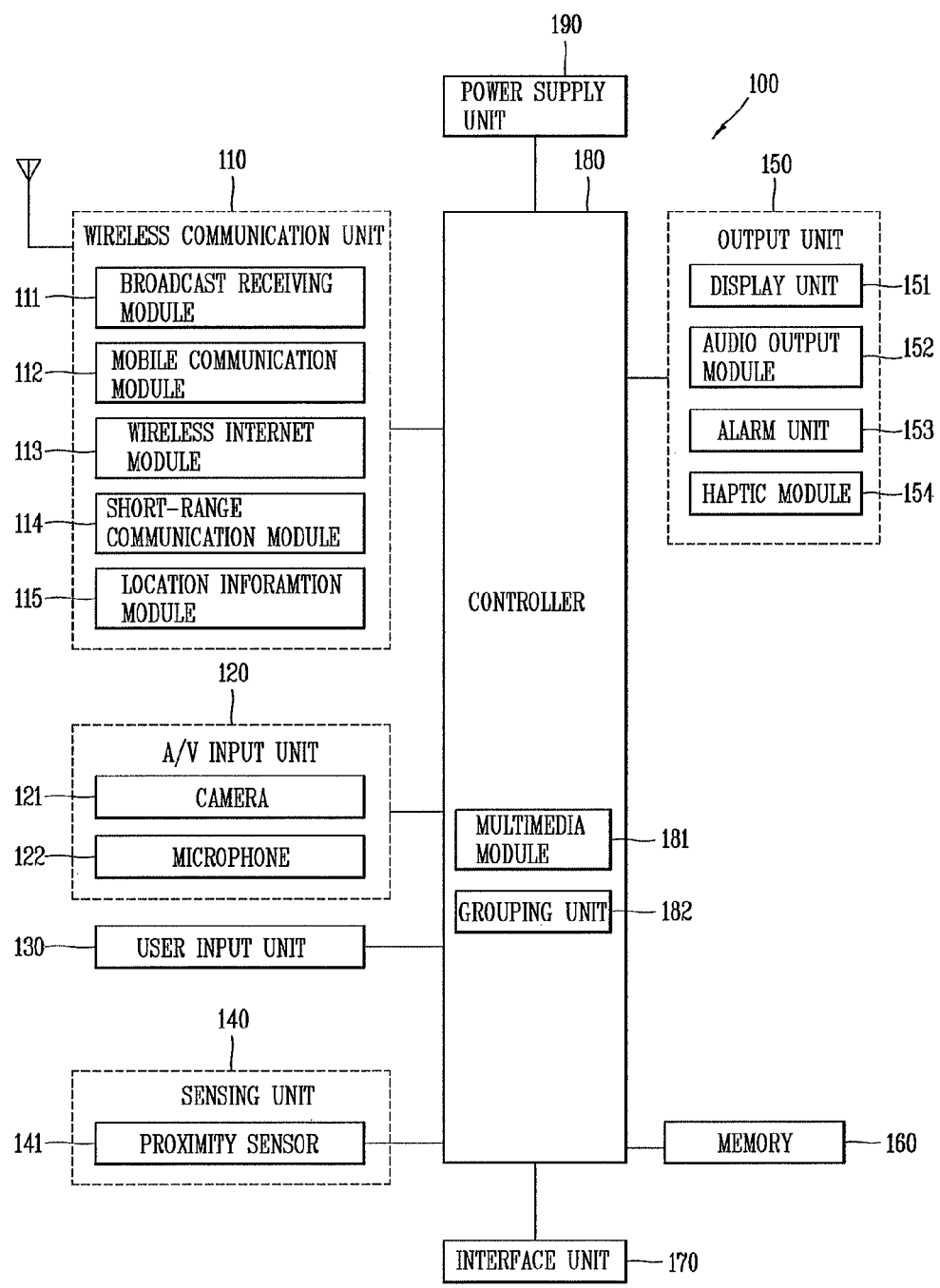
FIG. 1 is a block diagram illustrating a mobile terminal 100 according to an embodiment of the present disclosure.

FIG. 1 is a block diagram illustrating a mobile terminal 100 according to an embodiment of the present disclosure. Referring to FIG. 1, the mobile terminal 100 may include a wireless communication unit 110, an audio/video (NV) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile communication terminal may be implemented with greater or less number of elements than those illustrated elements.

Hereinafter, the constituent elements 110-190 of the mobile terminal 100 will be described in sequence.

The wireless communication unit 110 may include one or more elements allowing radio communication between the mobile terminal 100 and a wireless communication system, or allowing radio communication between the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel. The broadcast associated information may mean information regarding a broadcast channel, a broadcast program, a broadcast service provider, and the like. The broadcast associated information may also be provided through a mobile communication network. In this case, the broadcast associated information may be received by the mobile communication module 112. The broadcast signal and broadcast-associated information received through the broadcast receiving module 111 may be stored in the memory 160.

The mobile communication module 112 transmits and/or receives a radio signal to and/or from at least one of a base station, an external terminal and a server over a mobile communication network. The radio signal may include a voice call signal, a video call signal or various types of data according to text and/or multimedia message transmission and reception.

The wireless Internet module 113 as a module for supporting wireless Internet access may be built-in or externally installed to the mobile terminal 100. A variety of wireless Internet access techniques may be used, such as WLAN (Wireless LAN), Wi-Fi, Wibro (Wireless Broadband), Wimax (World Interoperability for Microwave Access), HSDPA (High Speed Downlink Packet Access), and the like.

The short-range communication module 114 refers to a module for supporting a short-range communication. A variety of short-range communication technologies may be used, such as Bluetooth, Radio Frequency IDentification (RFID), Infrared Data Association (IrDA), Ultra WideBand (UWB), ZigBee, and the like.

The location information module 115 is a module for acquiring a location of the mobile terminal 100, and there is a GPS module as a representative example.

Subsequently, referring to FIG. 1, the A/V (audio/video) input unit 120 receives an audio or video signal, and the A/V (audio/video) input unit 120 may include a camera 121, a microphone 122, and the like. The camera 121 processes an image frame, such as still or moving images, obtained by an image sensor in a video phone call or image capturing mode. The processed image frame may be displayed on a display unit 151. The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated during the process of receiving the external audio signal.

The user input unit 130 may generate input data to control an operation of the mobile terminal 100. The user input unit 130 may be configured with a keypad, a dome switch, a touch pad (pressure/capacitance), a jog wheel, a jog switch, and the like.

The sensing unit 140 detects presence or absence of the user's contact, and a current status of the mobile terminal 100 such as an opened or closed configuration, a location of the mobile terminal 100, an orientation of the mobile terminal 100, an acceleration or deceleration of the mobile terminal 100, and the like, and generates a sensing signal for controlling the operation of the mobile terminal 100. For example, when the mobile terminal 100 is a slide phone type, the sensing unit 140 may sense an opened or closed configuration of the slide phone. Furthermore, the sensing unit 140 may sense whether or not power is supplied from the power supply unit 190, or whether or not an external device is coupled to the interface unit 170.

The sensing unit 140 may include a proximity sensor 141. Furthermore, the sensing unit 140 may include a touch sensor (not shown) for sensing a touch operation with respect to the display unit 151.

The touch sensor may be implemented as a touch film, a touch sheet, a touch pad, and the like. The touch sensor may be configured to convert changes of a pressure applied to a specific part of the display unit 151, or a capacitance generated from a specific part of the display unit 151, into electric input signals. The touch sensor may be configured to sense not only a touched position and a touched area, but also a touch pressure.

When the touch sensor and display unit 151 forms an interlayer structure, the display unit 151 may be used as an input device rather than an output device. The display unit 151 may be referred to as a "touch screen".

When there is a touch input through the touch screen, the corresponding signals may be transmitted to a touch controller (not shown). The touch controller processes signals transferred from the touch sensor, and then transmits data corresponding to the processed signals to the controller 180. Accordingly, the controller 180 may sense which region of the display unit 151 has been touched.

When the touch screen is a capacitance type, the proximity of a sensing object may be detected by changes of an electromagnetic field according to the proximity of a sensing object. The touch screen may be categorized into a proximity sensor 141.

The proximity sensor 141 refers to a sensor for detecting the presence or absence of a sensing object using an electromagnetic field or infrared rays without a mechanical contact. The proximity sensor 141 has a longer lifespan and more enhanced utility than a contact sensor. The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like.

Hereinafter, for the sake of convenience of brief explanation, a behavior of closely approaching the touch screen without contact will be referred to as "proximity touch", whereas a behavior that the pointer substantially comes in contact with the touch screen will be referred to as "contact touch".

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The output unit 150 may generate an output related to visual, auditory, tactile senses. The output unit 150 may include a display unit 151, an audio output module 153, an alarm unit 154, a haptic module 155, and the like.

The display unit 151 may display (output) information processed in the mobile terminal 100. For example, when the mobile terminal 100 is operated in a phone call mode, the display unit 151 may display a user interface (UI) or graphic user interface (GUI) related to a phone call. When the mobile terminal 100 is operated in a video call mode or image capturing mode, the display unit 151 may display a captured image, a received image, UI, GUI, or the like.

The display unit 151 may include at least one of a liquid crystal display (LCD), a thin film transistor-liquid crystal display (TFT-LCD), an organic light emitting diode (OLED) display, a flexible display, a 3-dimensional (3D) display, and an e-ink display.

At least one of those displays (or display devices) included in the display unit 151 may be configured with a transparent or optical transparent type to allow the user to view the outside therethrough. It may be referred to as a transparent display. A representative example of the transparent display may be a transparent OLED (TOLED), and the like. Under this configuration, the user can view an object positioned at a rear side of the mobile device body through a region occupied by the display unit 151 of the mobile device body.

There may exist two or more display units 151 according to the implementation of the mobile terminal 100. For example, a plurality of the display units 151 may be placed on one surface in a separate or integrated manner, or may be place on different surfaces, respectively.

The audio output module 153 may output audio data received from the wireless communication unit 110 or stored in the memory 160, in a call-receiving mode, a call-placing mode, a recording mode, a voice selection mode, a broadcast reception mode, and the like. The audio output module 153 may output an audio signal related to a function carried out in the mobile terminal 100 (for example, sound alarming a call received or a message received, and the like). The audio output module 153 may include a receiver, a speaker, a buzzer, and the like.

The alarm unit 154 outputs signals notifying the occurrence of an event from the mobile terminal 100. The examples of an event occurring from the mobile terminal 100 may include a call received, a message received, a key signal input, a touch input, and the like. The alarm unit 154 may output not only video or audio signals, but also other types of signals such as signals for notifying the occurrence of an event in a vibration manner. Since the video or audio signals may be also output through the display unit 151 or the audio output unit 153, the display unit 151 and the audio output module 153 may be categorized into part of the alarm unit 153.

The haptic module 155 generates various tactile effects that can be felt by the user. A representative example of the tactile effects generated by the haptic module 155 may include vibration. Vibration generated by the haptic module 155 may have a controllable intensity, a controllable pattern, and the like. For example, different vibrations may be output in a synthesized manner or in a sequential manner.

The haptic module 155 may generate various tactile effects, including not only vibration, but also arrangement of pins vertically moved with respect to a skin surface being touched, air injection force or air suction force through an injection port or suction port, touch by a skin surface, contact with an electrode, effects by stimulus such as an electrostatic force, reproduction of cold or hot feeling using a heat absorbing device or heat emitting device, and the like.

The haptic module 155 may be configured to transmit tactile effects through the user's direct contact, or the user's muscular sense using a finger or a hand. Two or more haptic modules 155 may be provided according to the configuration of the mobile terminal 100.

The memory 160 may store a program for operating the controller 180, or temporarily store input/output data (for example, phonebooks, messages, still images, moving images, and the like). The memory 160 may store data related to various patterns of vibrations and sounds outputted when performing a touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the portable terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

The interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing related to telephony calls, data communications, video calls, and the like. The controller 180 may include a multimedia module 181 which provides multimedia playback. The multimedia module 181 may be configured as part of the controller 180 or as a separate component. The controller 180 can perform a pattern recognition processing so as to recognize a handwriting or drawing input on the touch screen as text or image.

The power supply unit 190 may receive external or internal power to provide power required by various components under the control of the controller 180.

Various embodiments described herein may be implemented in a computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180.

Hereinafter, the method of processing a user input to the mobile terminal 100 will be described.

The user input unit 130 is manipulated to receive a command for controlling the operation of the mobile terminal 100, and may include a plurality of manipulation units. The manipulation units may be commonly designated as a manipulating portion, and any method may be employed if it is a tactile manner allowing the user to perform manipulation with a tactile feeling.

Various kinds of visual information may be displayed on the display unit 151. The visual information may be displayed in the form of a character, a numeral, a symbol, a graphic, an icon, and the like. For an input of the visual information, at least one of a character, a numeral, a symbol, a graphic, and an icon may be displayed with a predetermined arrangement so as to be implemented in the form of a keypad. Such a keypad may be referred to as a so-called "soft key."

The display unit 151 may operate on an entire region or operate by dividing into a plurality of regions. In case of the latter, the plurality of regions may be configured to operate in an associative way. For example, an output window and an input window may be displayed on the upper and lower portions of the display unit 151, respectively. The output window and the input window may be regions allocated to output or input information, respectively. A soft key on which numerals for inputting a phone number or the like are displayed is outputted on the input window. When the soft key is touched, a numeral corresponding to the touched soft key is displayed on the output window. When the first manipulating unit is manipulated, a phone call connection for the phone number displayed on the output window will be attempted or a text displayed on the output window will be entered to the application.

The display unit 151 or touch pad may be configured to sense a touch scroll. The user may move an object displayed on the display unit 151, for example, a cursor or pointer placed on an icon or the like, by scrolling the display unit 151 or touch pad. Moreover, when a finger is moved on the display unit 151 or touch pad, a path being moved by the finger may be visually displayed on the display unit 151. It may be useful to edit an image displayed on the display unit 151.

In order to cope with a case where the display unit 151 and touch pad are touched together within a predetermined period of time, one function of the terminal 100 may be implemented. For the case of being touched together, there is a case when the user clamps a body of the mobile terminal 100 using his or her thumb and forefinger. For one of the above functions implemented in the mobile terminal 100, for example, there may be an activation or de-activation for the display unit 151 or touch pad.

Figure 2A:
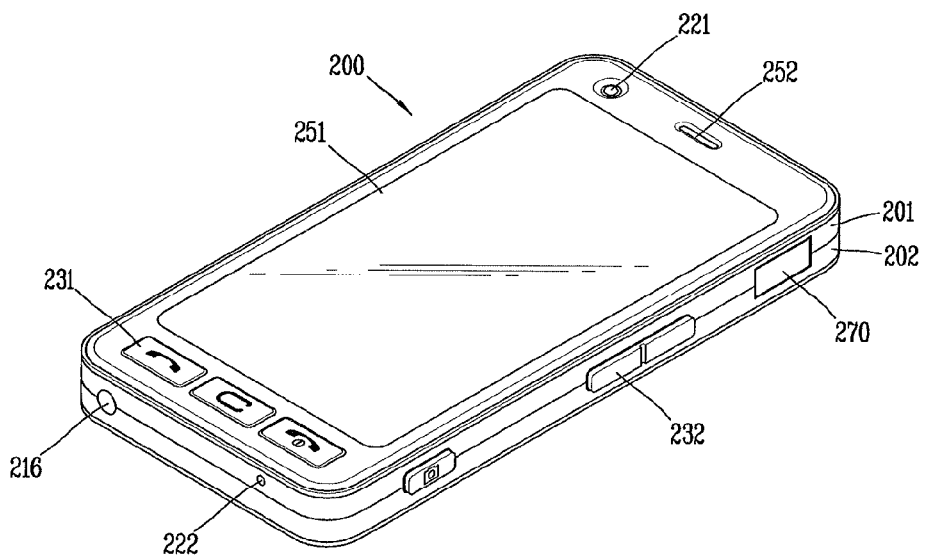
FIGS. 2A and 2B are perspective views illustrating the external appearance of a mobile terminal 100 related to the present disclosure.
Figure 2B:
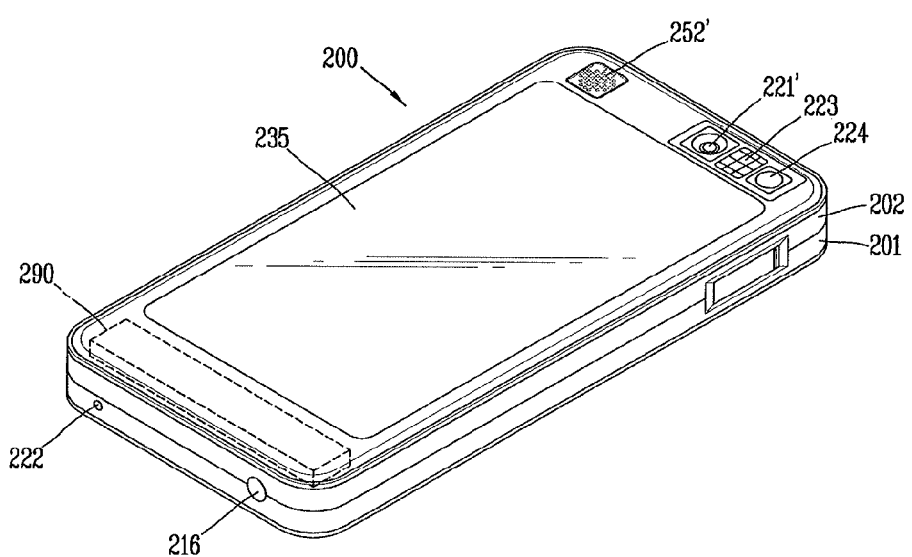

FIGS. 2A and 2B are perspective views illustrating the external appearance of a mobile terminal 100 related to the present disclosure. FIG. 2A is a front and a side view illustrating the mobile terminal 100, and FIG. 2B is a rear and the other side view illustrating the mobile terminal 100.

Referring to FIG. 2A, the mobile terminal 100 disclosed herein is provided with a bar-type terminal body. However, the present invention is not only limited to this type of terminal, but also applicable to various structures of terminals such as slide type, folder type, swivel type, swing type, and the like, in which two and more bodies are combined with each other in a relatively movable manner.

The terminal body includes a case (casing, housing, cover, etc.) forming an appearance of the terminal. In this embodiment, the case may be divided into a front case 101 and a rear case 102. Various electronic components may be integrated in a space formed between the front case 101 and the rear case 102. At least one middle case may be additionally disposed between the front case 101 and the rear case 102.

The cases may be formed by injection-molding a synthetic resin or may be also formed of a metal material such as stainless steel (STS), titanium (Ti), or the like.

A display unit 151, an audio output module 152, a camera 121, a user input unit 130 (refer to FIG. 1), a microphone 122, an interface 170, and the like may be arranged on the terminal body, mainly on the front case 101.

The display unit 151 occupies a most portion of the front case 101. The audio output unit 152 and the camera 121 are disposed on a region adjacent to one of both ends of the display unit 151, and the user input unit 131 and the microphone 122 are disposed on a region adjacent to the other end thereof. The user interface 132 and the interface 170, and the like, may be disposed on a lateral surface of the front case 101 and the rear case 102.

The user input unit 130 is manipulated to receive a command for controlling the operation of the portable terminal 100. The user input unit 130 may include a plurality of manipulation units 131, 132.

The manipulation units 131, 132 may receive various commands. For example, the first manipulation unit 131 may be used to receive a command, such as start, end, scroll, or the like. The second manipulation unit 132 may be used to receive a command, such as controlling a volume level being outputted from the audio output unit 152, or switching it into a touch recognition mode of the display unit 151.

Referring to FIG. 2B, a camera 121' may be additionally mounted on a rear surface of the terminal body, namely, the rear case 102. The rear camera 121' has an image capturing direction, which is substantially opposite to the direction of the front camera 121 (refer to FIG. 2A), and may have different number of pixels from those of the front camera 121.

For example, that the front camera 121 may be configured to have a relatively small number of pixels, and the rear camera 121' may be configured to have a relatively large number of pixels. Accordingly, in case where the front to camera 121 is used for video communication, it may be possible to reduce the size of transmission data when the user captures his or her own face and sends it to the other party in real time. On the other hand, the rear camera 121' may be used for the purpose of storing high quality images.

On the other hand, the cameras 121, 121' may be provided in the terminal body in a rotatable and popupable manner.

Furthermore, a flash 123 and a mirror 124 may be additionally disposed adjacent to the rear camera 121'. The flash 123 illuminates light toward an object when capturing the object with the camera 121'. The mirror 124 allows the user to look at his or her own face, or the like, in a reflected way when capturing himself or herself (in a self-portrait mode) by using the rear camera 121'.

Furthermore, a rear audio output unit 152' may be additionally disposed on a rear surface of the terminal body. The rear audio output unit 152' together with the front audio output unit 152 (refer to FIG. 2A) can implement a stereo function, and it may be also used to implement a speaker phone mode during a phone call.

Furthermore, an antenna 116 for receiving broadcast signals may be additionally disposed on a lateral surface of the terminal body. The antenna 116 constituting part of a broadcast receiving module 111 (refer to FIG. 1) may be provided so as to be pulled out from the terminal body.

Furthermore, a power supply unit 190 for supplying power to the portable terminal 100 may be mounted on the terminal body. The power supply unit 190 may be configured so as to be incorporated in the terminal body, or directly detachable from the outside of the terminal body.

A touch pad 135 for detecting a touch may be additionally mounted on the rear case 102. The touch pad 135 may be also configured with an optical transmission type, similarly to the display unit 151 (refer to FIG. 2A). Alternatively, a rear display unit for displaying visual information may be additionally mounted on the touch pad 135. At this time, information displayed on the both surfaces of the front display unit 151 and rear display unit may be controlled by the touch pad 135.

The touch pad 135 may be operated in conjunction with the display unit 151 of the front case 101. The touch pad 135 may be disposed in parallel at a rear side of the display unit 151. The touch pad 135 may have the same size as or a smaller size than the display unit 151.

Meanwhile, the terminal 100 can display a plurality of objects. A user classifies and groups the plurality of objects for each category in order to easily find a desired object among the plurality of objects. However, in this case, the user can specify a folder in which objects is to be included by applying a touch input to a popup window related to folder specification, displayed on the display unit 151 after selecting the objects, or can allow objects to be included in a folder by dragging the objects in the direction of the folder to be grouped. Accordingly, an error in a user input may occur in the process of user's grouping objects, i.e., the process of user's selecting a folder in which the objects is to be included.

Hereinafter, a mobile terminal 100 and a control method therefor, which can efficiently group objects will be described with reference to the accompanying drawings.

Figure 3:
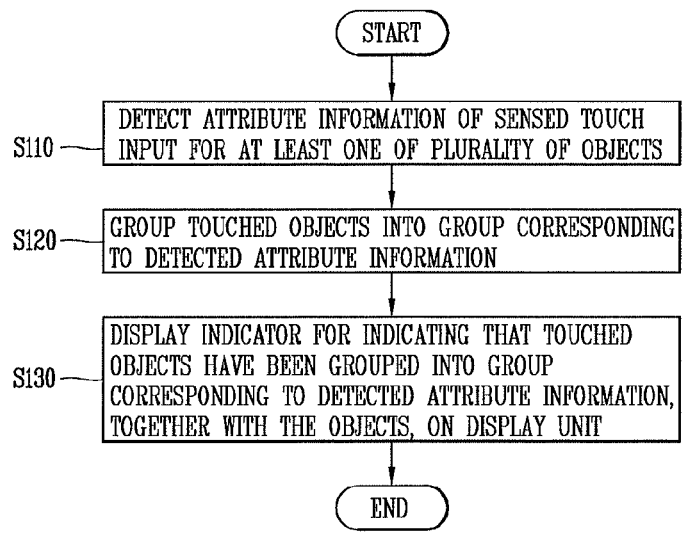
FIG. 3 is a flowchart illustrating an exemplary embodiment of the mobile terminal.

FIG. 3 is a flowchart illustrating an exemplary embodiment of the mobile terminal 100 (See FIG. 1). The mobile terminal 100 may include a display unit 151 (See FIG. 1), a grouping unit 182 (See FIG. 1) and a control unit 180 (See FIG. 1).

Referring to FIG. 3, when a touch input for at least one of a plurality of objects is sensed, attribute information of the sensed touch input is detected (S110).

Here, the object may include an icon, a widget, an application execution menu, a thumbnail image, etc.

The touch input may include at least one of a single tap gesture, a double tap gesture, a drag gesture, a flick gesture, a pinch-in gesture and a pinch-out gesture.

When a touch input for objects is sensed, the grouping unit 182 may detects a degree of the touch input applied as attribute information. Specifically, the grouping unit 182 may decide the degree of the touch input applied by detecting at least one of a change in touch operation and a maintenance time of the touch operation from the start to the release of the touch input. Here, the degree of the touch input applied may be a time for which the touch input is maintained, a number of times of applying the touch input, a length of the touch input dragged, etc. When multiple touch inputs are sensed, the degree of the touch inputs may be a distance between points at which first and second touch inputs are input, respectively.

Next, the touched objects are grouped into a group corresponding to the detected attribute information (S120).

Specifically, the grouping unit 182 may determine a group in which the objects are to be included, based on the degree of the touch input applied. More specifically, in a case where a drag input is applied to a first object, the grouping unit 182 may compute a first drag length, based on a release point of the first drag input for the first object. Next, the grouping unit 182 may group the first object into a first group corresponding to the first drag length.

In a case where a second drag input different from the first drag input is applied to a second object different from the first object, the grouping unit 182 may compute a second drag length, based on a release point of the second drag input for the second object. Next, the grouping unit 182 may group the second object into a second group corresponding to the second drag length.

Meanwhile, although not shown in this figure, when the start of the application of a touch input to objects is sensed, the grouping unit 182 may display one or more different indicators on the display unit 151, based on a degree of the touch input applied. When the touch input is released, the grouping unit 182 may group the objects into a group corresponding to any one of the indicators displayed on the display unit 151.

Specifically, when the start of the application of a drag input to objects, the grouping unit 182 may compute a drag length and then display indicators corresponding to the drag length on the display unit 151. When the drag input is released, the grouping unit 182 may group the objects into a group corresponding to the drag length.

In this case, the indicators may operate as a progress bar that represents a degree of the drag input applied. A user can visually confirm the degree of the drag input applied through the indicators. In addition, the user can visually confirm how much more the user is to apply the drag input to the objects to be grouped into a desired group, i.e., how much more the user is to maintain the drag input.

Although not shown in this figure, when a touch input is sensed, the grouping unit 182 may display, on the display unit 151, a popup window including a plurality of indicators respectively corresponding to a plurality of groups. Next, when the user selects at least one of the indicators, the grouping unit 182 may group the objects into a group corresponding to the selected indicator.

Subsequently, an indicator indicating that the touched objects have been grouped into the group corresponding to the detected attribute information is displayed together with the objects on the display unit 151 (S130).

Specifically, the control unit 180 may display the indicator on the object, or may display the indicator on a place adjacent to the object. The indicator may include an icon having a color corresponding to each of the plurality of groups. For example, in a case where a first object is grouped into a first group, the control unit 180 may display an icon having a color corresponding to the first group on the first object or a place adjacent to the first object.

Meanwhile, the indicator may include an icon having a shape, a size, a transparency and a thickness, as well as the color corresponding to each of the plurality of groups.

Although a separate icon is not displayed on the object, the control unit 180 may change the color of the entire object, may change the color of a portion of the object, or may change the color of a character included in the object. That is, the control unit 180 may control the object so that the object acts as an indicator.

The control unit 180 may change at least one of the color, shape, kind, size, transparency and thickness of the indicator, based on a touch input for the indicator. For example, the control unit 180 may change the icon having the color corresponding to the first group displayed together with the first object into an icon having a shape corresponding to the first group.

As described above, according to the exemplary embodiment, attribute information of a touch input applied to objects is detected, and the touched objects are grouped into a group corresponding to the detected attribute information, so that the objects can be grouped without any complicated manipulation. Accordingly, the user can conveniently and quickly group the objects. Further, an error in a user input can be minimized in a process of selecting a folder in which the objects are to be included.

According to the exemplary embodiment, an indicator indicating that the objects have been grouped into a specific group is displayed together with the objects, so that the user can visually confirm groups in which the respective objects are included. Further, the user can change the group in which the object is included into another group through a touch input for the indicator. As a result, user's convenience can be improved.

Figure 4:
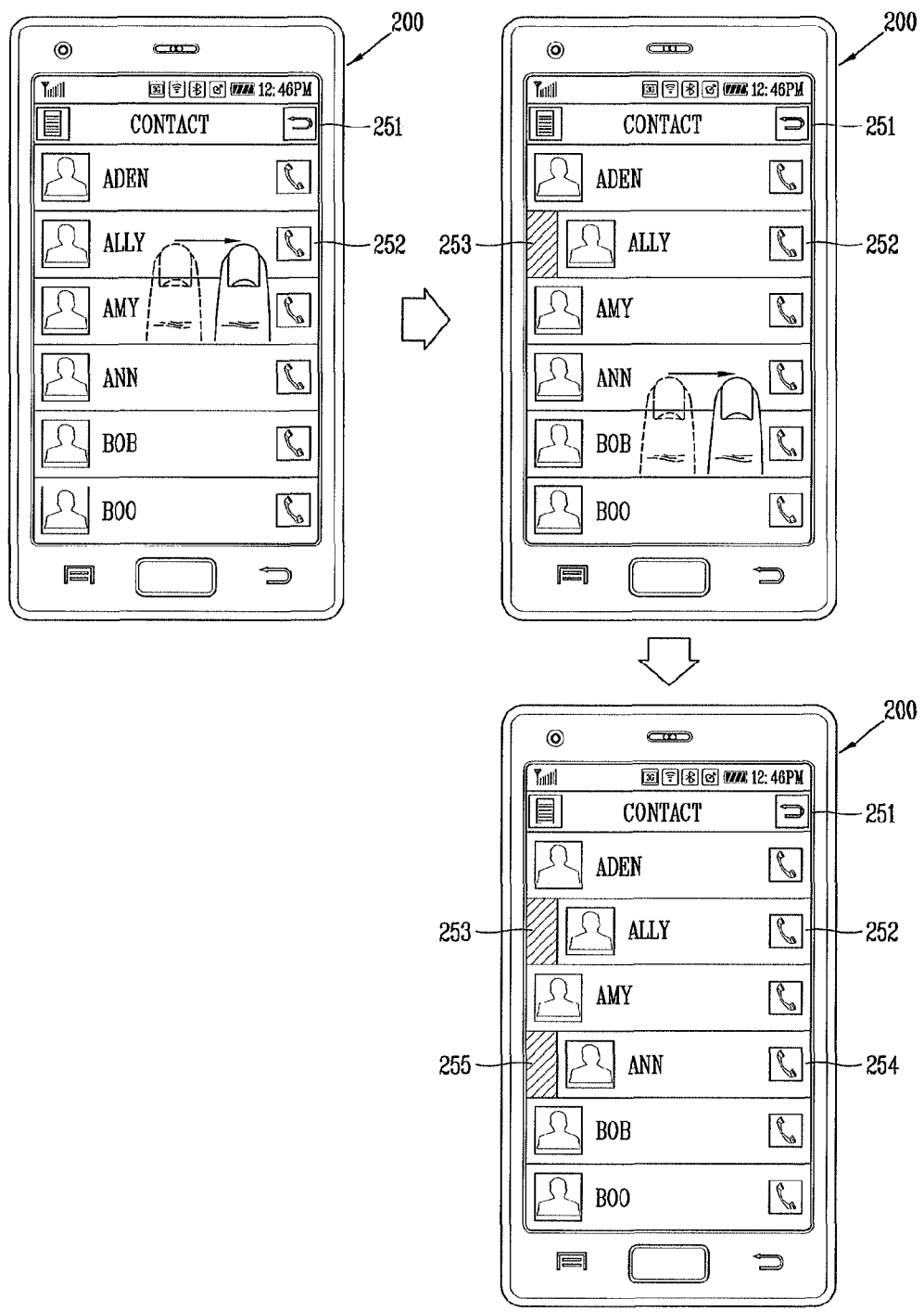
FIGS. 4 to 17 illustrate operational examples of mobile terminals according to FIG. 3.

FIG. 4 illustrates operational examples of mobile terminals according to FIG. 3. The mobile terminal 200 may include a display unit 251, a grouping unit 182 (See FIG. 1) and a control unit 180 (See FIG. 1).

Referring to FIG. 4, the display unit 251 may display a plurality of objects including contact address information. In a case where a touch input for a first object 252 among the plurality of objects, e.g., a first drag input is sensed, the grouping unit 182 may detect attribute information of the first drag input. For example, the grouping unit 182 may compute a first drag length as the attribute information of the first drag input.

Subsequently, the grouping unit 182 may group the first object 252 into a first group corresponding to the first drag length. In this case, the control unit 182 may display a first indicator 253 indicating that the first object 252 has been grouped into the first group, together with the first object 252. As shown in this figure, the first indicator 253 is an icon having a color corresponding to the first group, and may be displayed on the first object 252.

Next, in a case where a touch input for a second object 254, e.g., a second drag input is sensed, the grouping unit 182 may compute a second drag length as attribute information of the second drag input.

In a case where the second drag length is identical to the first drag length or in a case where the first and second drag lengths have a difference within a predetermined range, the grouping unit 182 may group the second object 254 into the first group corresponding to the first drag length, as shown in this figure. Accordingly, the first and second objects 252 and 254 can be included in the same group.

Similarly, the control unit 180 may display a second indicator 255 indicating that the second object 254 has been grouped into the first group, together with the second object 254. As shown in this figure, the second indicator 255 may have the same shape and color as the first indicator 253.

Meanwhile, although not shown in this figure, in a case where a touch input for at least one of the first and second indicators 253 and 255 is sensed, the control unit 180 may extract the objects (e.g., the first and second objects 252 and 254) included in the group (e.g., the first group) corresponding to the touched indicator. Subsequently, the control unit 180 may display the extracted first and second objects 252 and 254 on the display unit 251.

Figure 5:
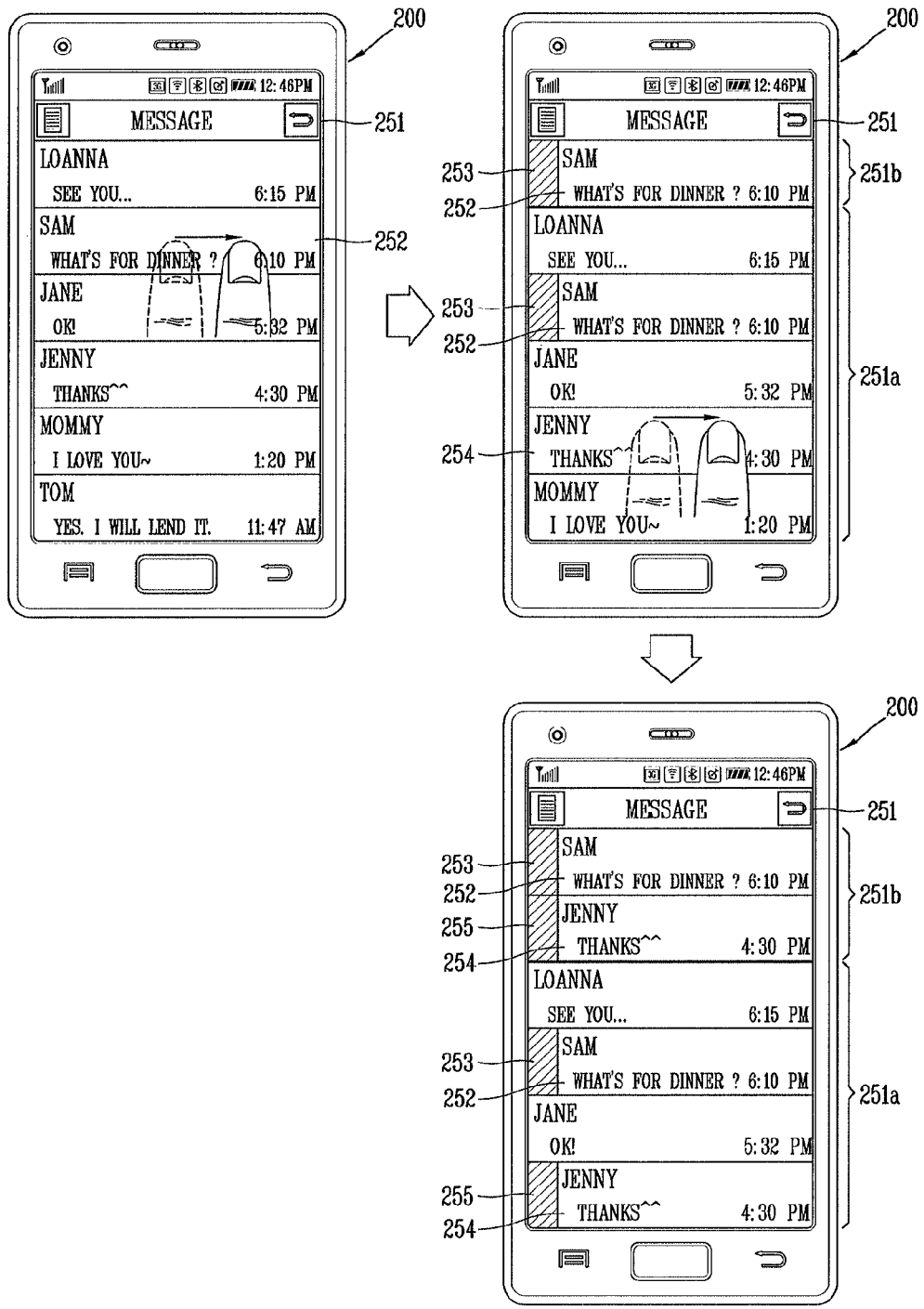

FIG. 5 illustrates operational examples of mobile terminals according to FIG. 3. The mobile terminal 200 may include a display unit 251, a grouping unit 182 (See FIG. 1) and a control unit 180 (See FIG. 1).

Referring to FIG. 5, the display unit 251 may display a plurality of objects including message information. In a case where a touch input for a first object 252 among the plurality of objects, e.g., a first drag input is sensed, the grouping unit 182 may compute a first drag length as attribute information of the first drag input.

Subsequently, the grouping unit 182 may group the first object 252 into a first group corresponding to the first drag length. In this case, the control unit 180 may display a first indicator 253 indicating that the first object 252 has been grouped into the first group, together with the first object 252.

The control unit 180 may generate a control command for performing a function of dividing a screen displayed on the display unit 251 into a plurality of regions (hereinafter, referred to a 'screen division command'). The control unit 180 may set first and second screen regions 251a and 251b displayed on the display unit 251, based on the screen division command. As shown in this figure, the first and second screen regions 251a and 251b may respectively correspond to lower and upper regions generated by dividing the entire screen region of the display unit 251 in the lateral direction.

Although not shown in this figure, the first and second screen regions 251a and 251b may respectively correspond to left and right regions generated by dividing the entire screen region of the display unit 251 in the longitudinal direction. Meanwhile, the number of regions simultaneously displayed on the display unit 251 is not limited thereto, and may be variously changed. The first and second screen regions 251a and 251b may be formed so that a scroll for each of the first and second regions 251a and 251b is possible.

The bar for dividing the first and second screen regions 251a and 251b may be selected, based on a touch input applied on the display unit 251. For example, in a case where the bar is dragged in the direction of the second screen region 251b, the bar may be moved in the direction of the second screen region 251b. Accordingly, the size of the first screen region 251a can be enlarged, and simultaneously, the size of the second screen region 251b can be reduced.

As shown in this figure, the plurality of objects may be displayed in the first screen region 251a that is the lower region generated in the division of the display unit 251. The control unit 180 may display objects grouped by a touch input among the plurality of objects in the second screen region 251b. For example, the control unit 180 may display the first object 252 grouped into the first group in the second screen region 251b.

Subsequently, in a case where a touch input for a second object 254 among the plurality of objects, e.g., a second drag input is sensed, the grouping unit 182 may compute a second drag length as attribute information of the second drag input.

In a case where the second drag length is identical to the first drag length or in a case where the first and second drag lengths have a difference within a predetermined range, the grouping unit 182 may group the second object 254 into the first group corresponding to the first drag length, as shown in this figure. Accordingly, the first and second objects 252 and 254 can be included in the same group.

Similarly, the control unit 180 may display a second indicator 255 indicating that the second object 254 has been grouped into the first group, together with the second object 254. As shown in this figure, the second indicator 255 may have the same shape and color as the first indicator 253. Similarly, the control unit 180 may display the second object 254 grouped into the first group, together with the first object 252, in the second screen region 251b.

Meanwhile, as the objects are grouped, the number of objects displayed in the second screen region 251b may be set by a user. When a predetermined time elapses, the objects displayed in the second screen region 251b may sequentially disappear. When the predetermined time elapses, the divided screens may be restored to an original state.

Figure 6:
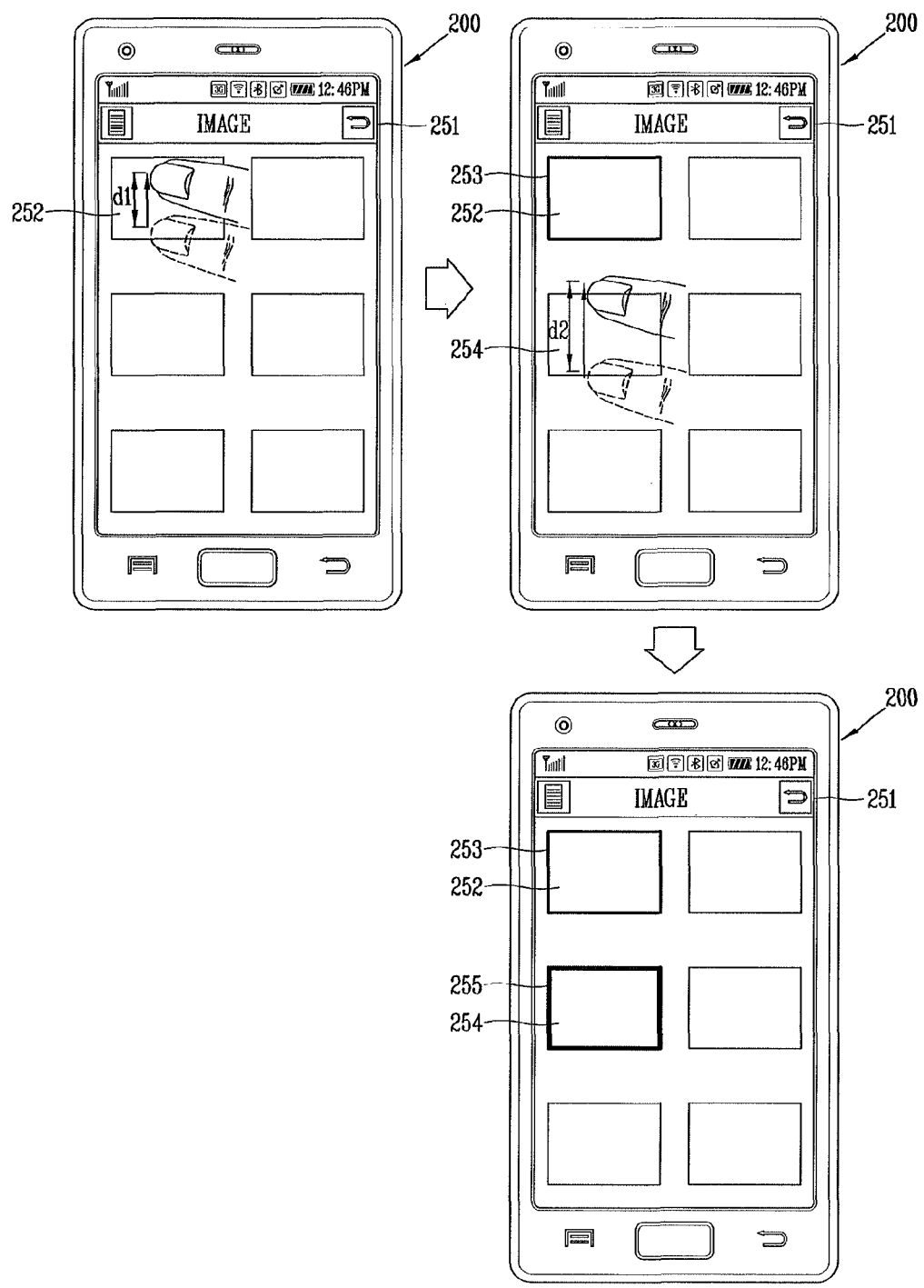

FIG. 6 illustrates operational examples of mobile terminals according to FIG. 3. The mobile terminal 200 may include a display unit 251, a grouping unit 182 (See FIG. 1) and a control unit 180 (See FIG. 1).

Referring to FIG. 6, the display unit 251 may include a plurality of objects including image information. In a case where a touch input for a first object 252 among the plurality of objects, e.g., a first drag input is sensed, the grouping unit 182 may compute a first drag length as attribute information of the first drag input.

Subsequently, the grouping unit 182 may group the first object 252 into a first group corresponding to the first drag length. In this case, the control unit 180 may display a first indicator 253 indicating that the first object 252 has been grouped into the first group, together with the first object 252. Here, the first indicator 253 may have a frame shape surrounding the first object 252.

Next, in a case where a touch input for a second object 254 among the plurality of objects, e.g., a second drag input is sensed, the grouping unit 182 may compute a second drag length as attribute information of the second drag input.

In a case where the first and second drag lengths have a difference within a predetermined range, the grouping unit 182 may group the second object 254 into a second group different from the first group, i.e., a second group corresponding to the second drag length, as shown in this figure. Accordingly, the first and second objects 252 and 254 may be included in different groups, respectively.

Similarly, the control unit 180 may display a second indicator 255 indicating that the second object 254 has been grouped into the second group, together with the second object 254. As shown in this figure, the second indicator 255 may have a different shape from the first indicator 253, e.g., a thicker shape than the first indicator 253.

Meanwhile, although not shown in this figure, in a case where an object includes image information, the control unit 180 may recognize figures included in the image and tag the mage with contact address information corresponding to each figure. A separate indicator may be displayed on the object having the image tagged with the contact address information.

Figure 7:
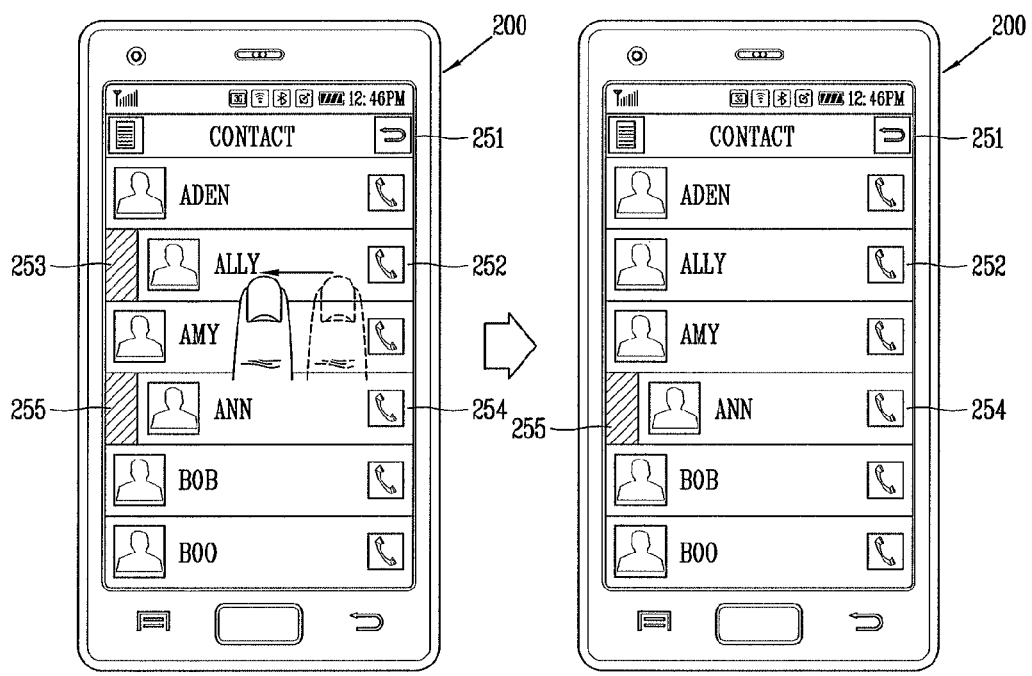
Figure 8:
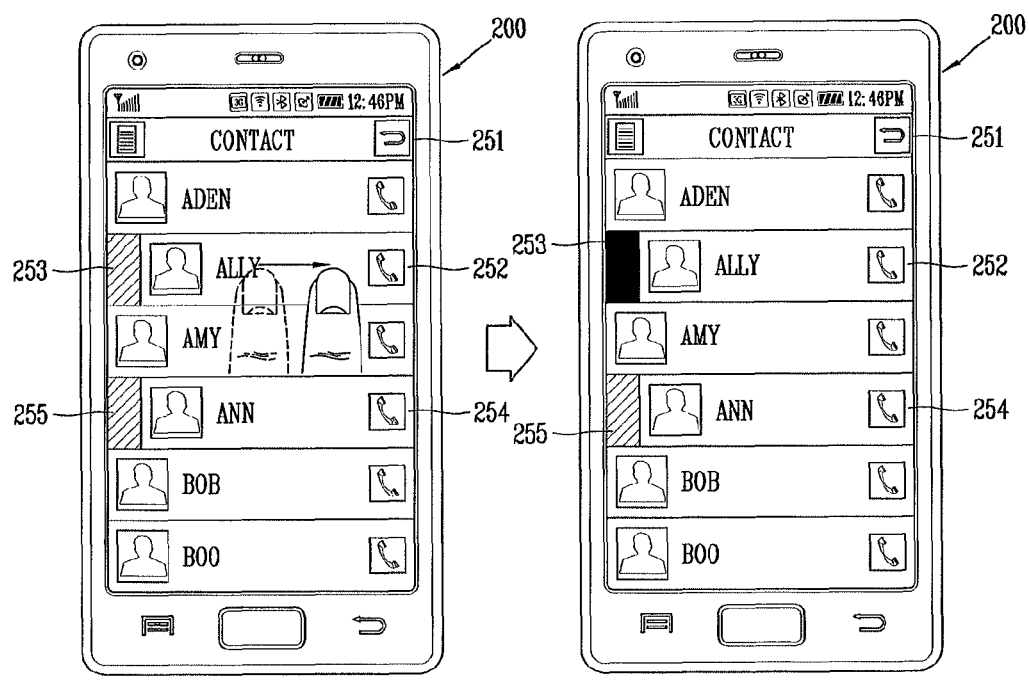

FIGS. 7 and 8 illustrate operational examples of mobile terminals according to FIG. 3. The mobile terminal 200 may include a display unit 251, a grouping unit 182 (See FIG. 1) and a control unit 180 (See FIG. 1). The display unit 251 may display a plurality of objects including contact address information.

In a case where a first touch input for a first object 252 among the plurality of objects, e.g., a first drag input in a first direction is sensed as shown in FIGS. 4 to 6, the grouping unit 182 may group the first object 252 into a group corresponding to attribute information of the first drag input, e.g., a first group.

Subsequently, in a case where a second touch input for the first object 252 grouped into the first group, e.g., a second drag input in a second direction is sensed, the grouping unit 182 may release the grouping of the first object 252 as shown in FIG. 7. In this case, the control unit 180 may allow an indicator 253 indicating that the first object 252 has been grouped into the first group, which is displayed together with the first object 252, to disappear from the display unit 251.

In a case where the second touch input for the first object 252 grouped into the first group, e.g. the second drag input of which drag length is different from that of the first drag input is sensed, the grouping unit 182 may change the first group in which the first object 252 is included into another group as shown in FIG. 8.

Specifically, the grouping unit 182 may compute a second drag length as attribute information of the second drag input. Subsequently, the grouping unit 182 may change a group in which the first object 252 is to be included from the first group into a second group corresponding to the second drag length. In this case, the control unit 180 may change the color of the indicator 253 so as to indicate that the first object 252 has been grouped into the second group.

Meanwhile, although not shown in these figures, in a case where the second touch input for the first object 252 grouped into the first group, e.g., the second drag input of which drag length is different from that of the first drag input is sensed, the grouping unit 182 may group the first object 252 into the second group corresponding to the second drag length. That is, the first object 254 may be included in both the first and second groups. In this case, the control unit 180 may display two indicators 253 so as to indicate that the first object 252 has been grouped into both the first and second groups.

Figure 9:
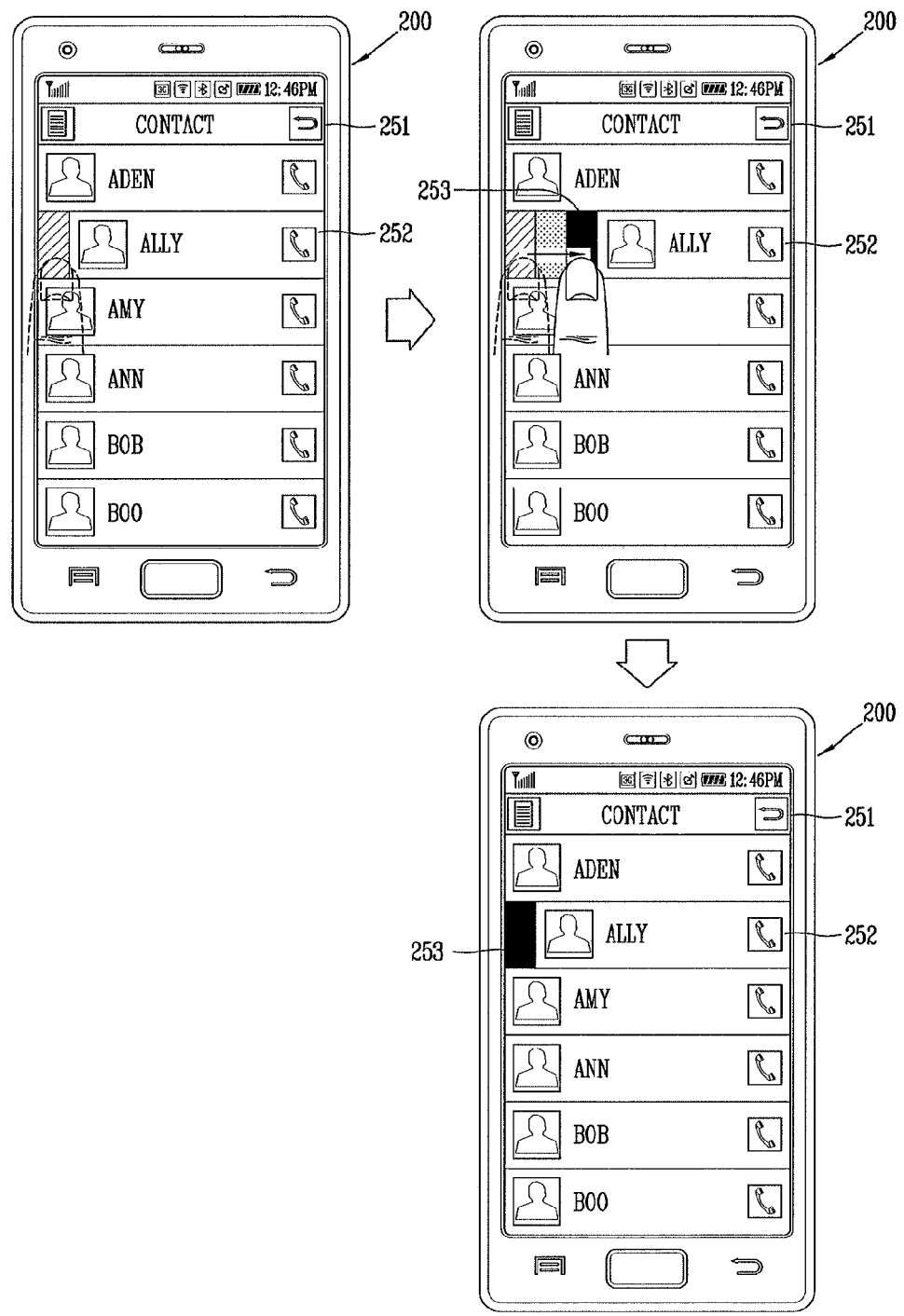
Figure 10:
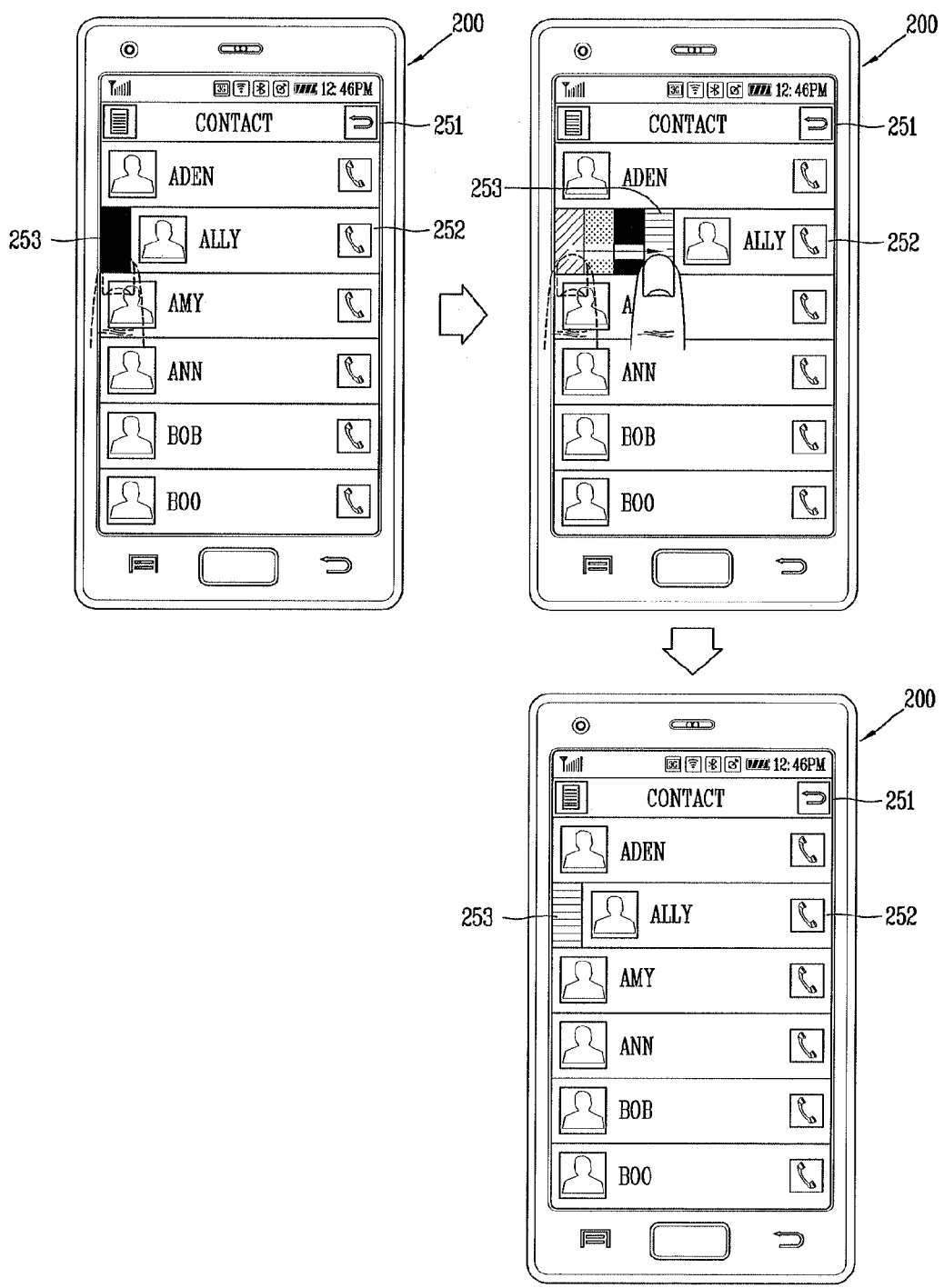

FIGS. 9 and 10 illustrate operational examples of mobile terminals according to FIG. 3. The mobile terminal 200 may include a display unit 251, a grouping unit 182 (See FIG. 1) and a control unit 180 (See FIG. 1).

Referring to FIG. 9, the display unit 251 may include a plurality of objects including contact address information. When the start of the application of a touch input to any one 252 among the plurality of objects, the grouping unit 182 may compute a drag length. Then, the grouping unit 182 may display indicators corresponding to the drag length on the display unit 151 and group the object 252 into a group corresponding to the drag length.

When a first drag input for the object 252 is sensed as shown in this figure, the grouping unit 182 may compute a first drag length as attribute information of the first drag length. As the first drag input is continued, the first drag length may gradually increase.

In a case where the first drag length is a predetermined length 'a', the grouping unit 182 may display an indicator corresponding to the length 'a' on the display unit 251. In a case where the first drag length reaches a length 'b' longer then the length 'a', the grouping unit 182 may display indicators respectively corresponding to the lengths 'a' and 'b' on the display unit 251. Subsequently, in a case where the first drag length reaches a length 'c' longer than the length 'b', the grouping unit 182 may display indicators respectively corresponding to the lengths 'a', 'b' and 'c' on the display unit 251.

That is, as the first drag length gradually increases while the first drag input is continued, the number of indicators displayed on the display unit 251 may increase. Here, the indicators may be operated as a progress bar that represents a degree of the drag input applied. A user can visually confirm the degree of the drag input applied through the indicators displayed on the display unit 251. In addition, the user can visually confirm how much more the user is to apply the drag input so that the object is grouped into a desired group i.e., how much more the drag input is to be maintained, through the indicators.

Subsequently, when the first drag input is released, the grouping unit 182 may group the object 252 into a group (hereinafter, referred to as a 'first group') corresponding to the indicator (indicator corresponding to the drag length 'c') 253 which has been displayed latest among the indicators displayed on the display unit 251 in the release of the first drag input. As the object 252 is grouped into the first group, the control unit 180 may display the indicator 253 which has been displayed latest, i.e., the indicator 253 corresponding to the first group, together with the object 252, on the display unit 251.

Referring to FIG. 10, in a case where a second drag input for the object 252 grouped into the first group is sensed, the grouping unit 182 may change the first group in which the object 252 is included into another group.

Specifically, the grouping unit 182 may compute a second drag length as attribute information of the second drag input. In a case where the second drag length reaches a length 'd' longer than the length 'c', the grouping unit 182 may display indicators respectively corresponding to the lengths 'a', 'b', 'c' and 'd' on the display unit 251, as shown in this figure.

Subsequently, when the second drag input is released, the grouping unit 182 may change a group in which the object 252 is to be included into a group (hereinafter, referred to as a 'second group') corresponding to the indicator (indicator corresponding to the length 'd') 253 which has been displayed latest. In this case, the control unit 180 may change the color of the indicator 253 so as to indicate that the object 252 has been grouped into the second group.

Figure 11:
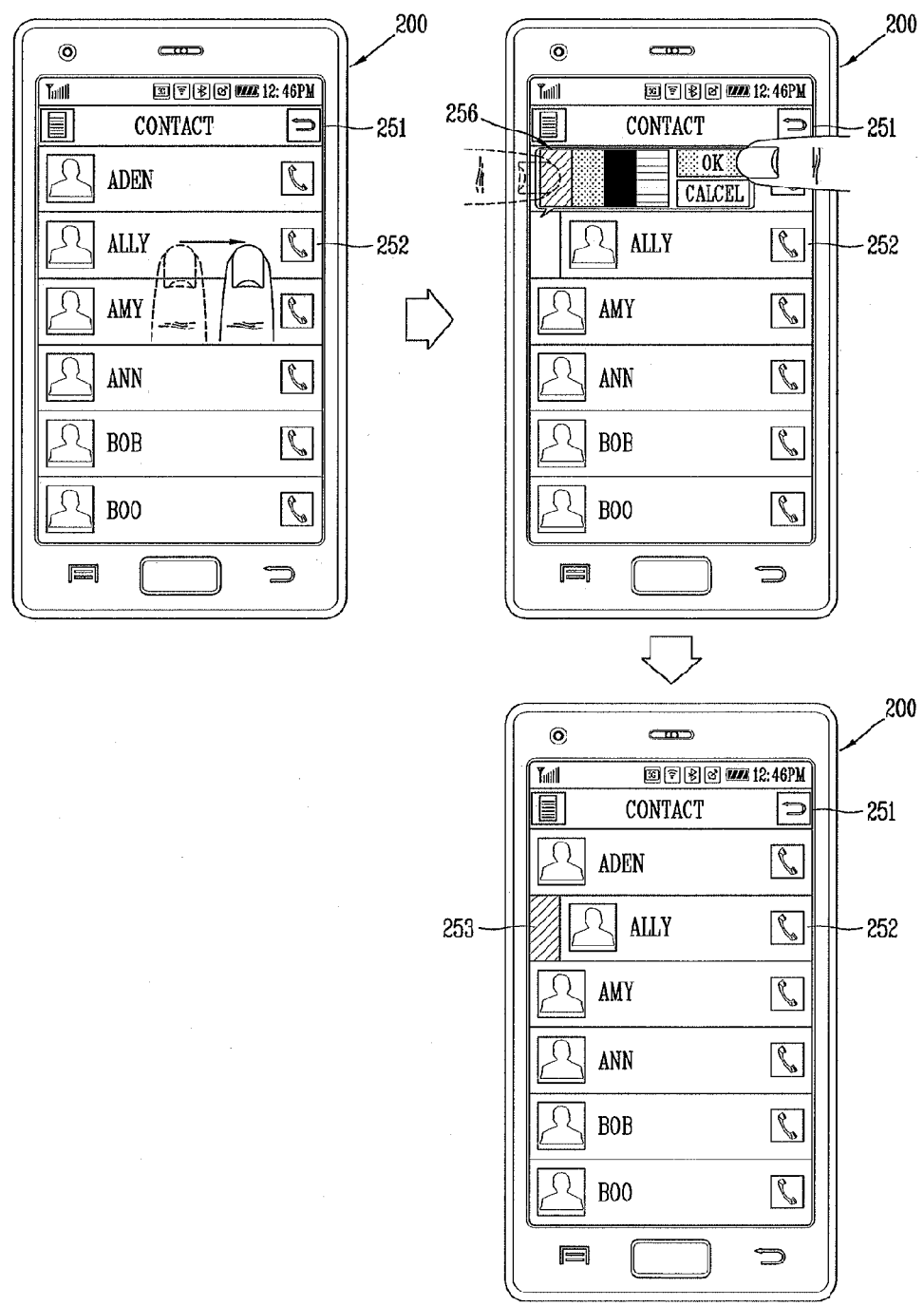
Figure 12:
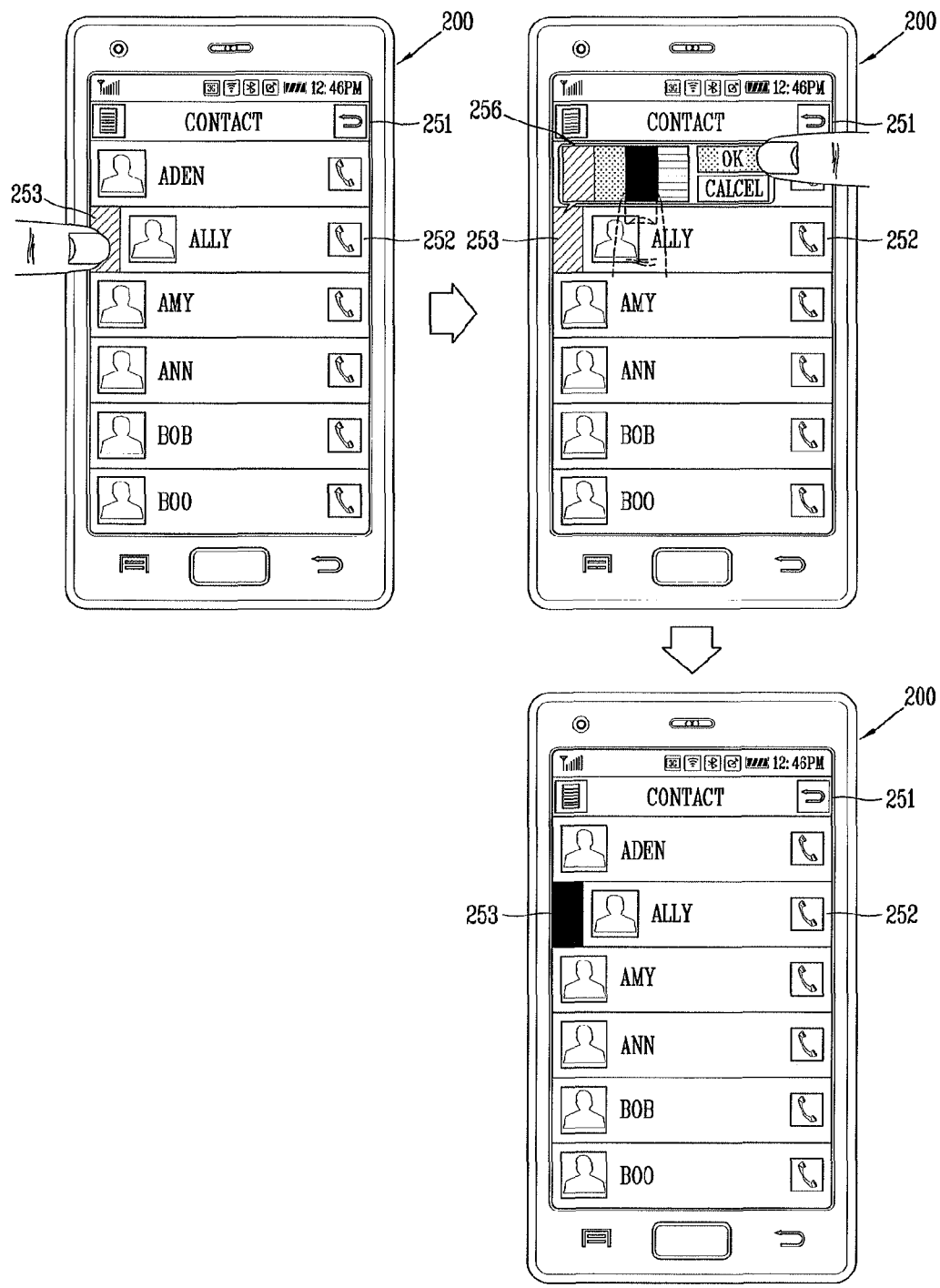

FIGS. 11 and 12 illustrate operational examples of mobile terminals according to FIG. 3. The mobile terminal 200 may include a display unit 251, a grouping unit 182 (See FIG. 1) and a control unit 180 (See FIG. 1).

Referring to FIG. 11, the display unit 251 may include a plurality of objects including contact address information. When the start of the application of a touch input to any one 252 of the plurality of objects is sensed, the grouping unit 182 may display, on the display unit 251, a popup window including a plurality of indicators 256 respectively corresponding to a plurality of groups.

Next, when a user selects at least one of the indicators 256, the grouping unit 182 may group the object 252 into a group (hereinafter, referred to as a 'first group') corresponding to the selected indicator. As the object 252 is grouped into the first group, the control unit 180 may display an indicator 253 having the same shape as the selected indicator, together with the object 252, on the display unit 251.

Referring to FIG. 12, in a case where a touch input for the indicator 253 displayed together with the object 252 grouped into the first group is sensed, the grouping unit 182 may display, on the display unit 251, a popup window including a plurality of indicators 256 respectively corresponding to a plurality of groups.

Next, when the user selects at any one of the indicators 256, the grouping unit 182 may change the first group in which the object 252 is included into another group (hereinafter, referred to as a 'second group') corresponding to the selected indicator. In this case, the control unit 180 may change the color of the indicator 253 so as to indicate that the object 252 has been grouped into the second group.

Meanwhile, although not shown in this figure, when the user selects a plurality of indicators among the indicators 256, the grouping unit 182 may group the object 252 into a plurality of groups respectively corresponding to the selected indicators.

Figure 13:
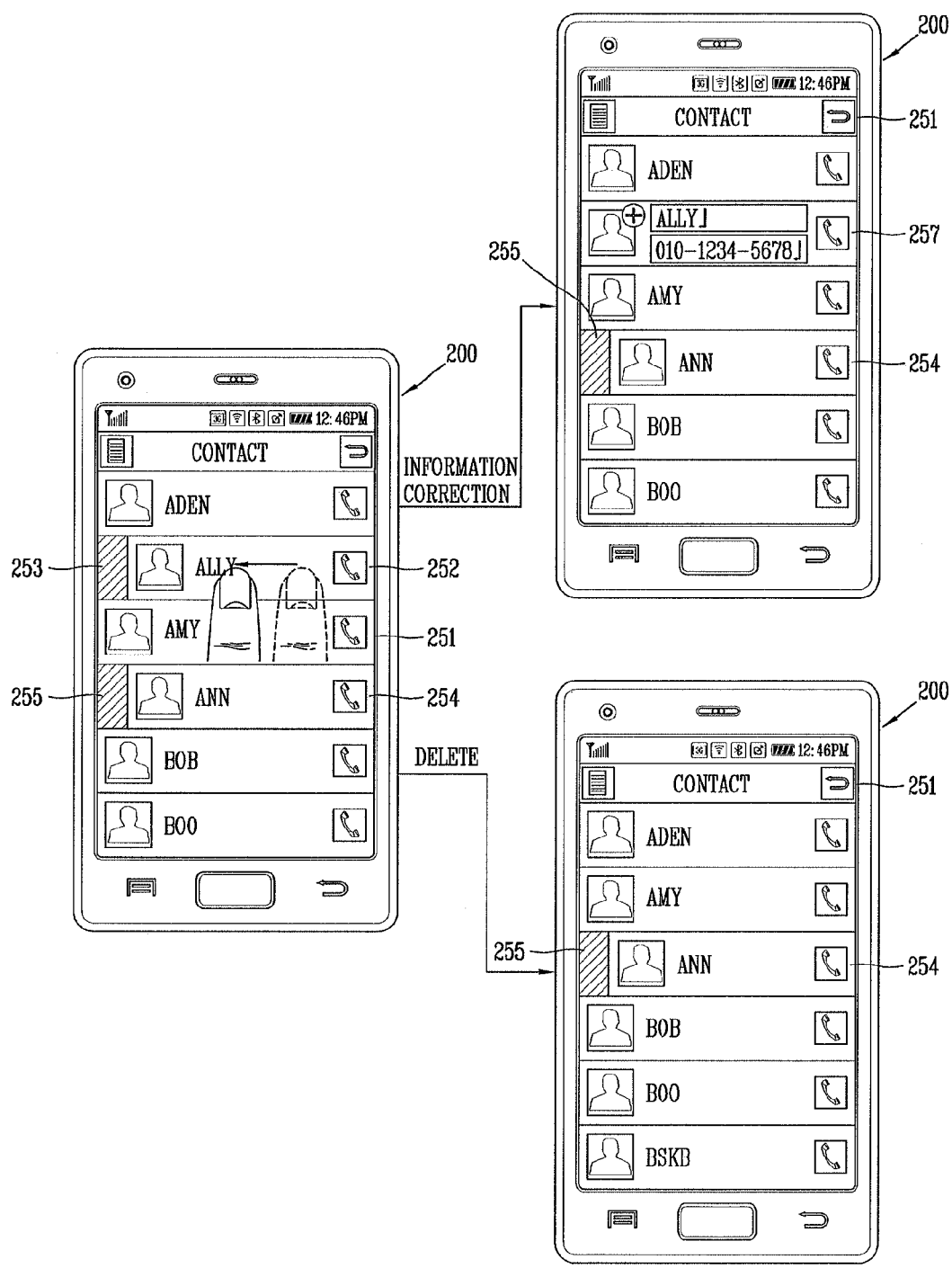
Figure 14:
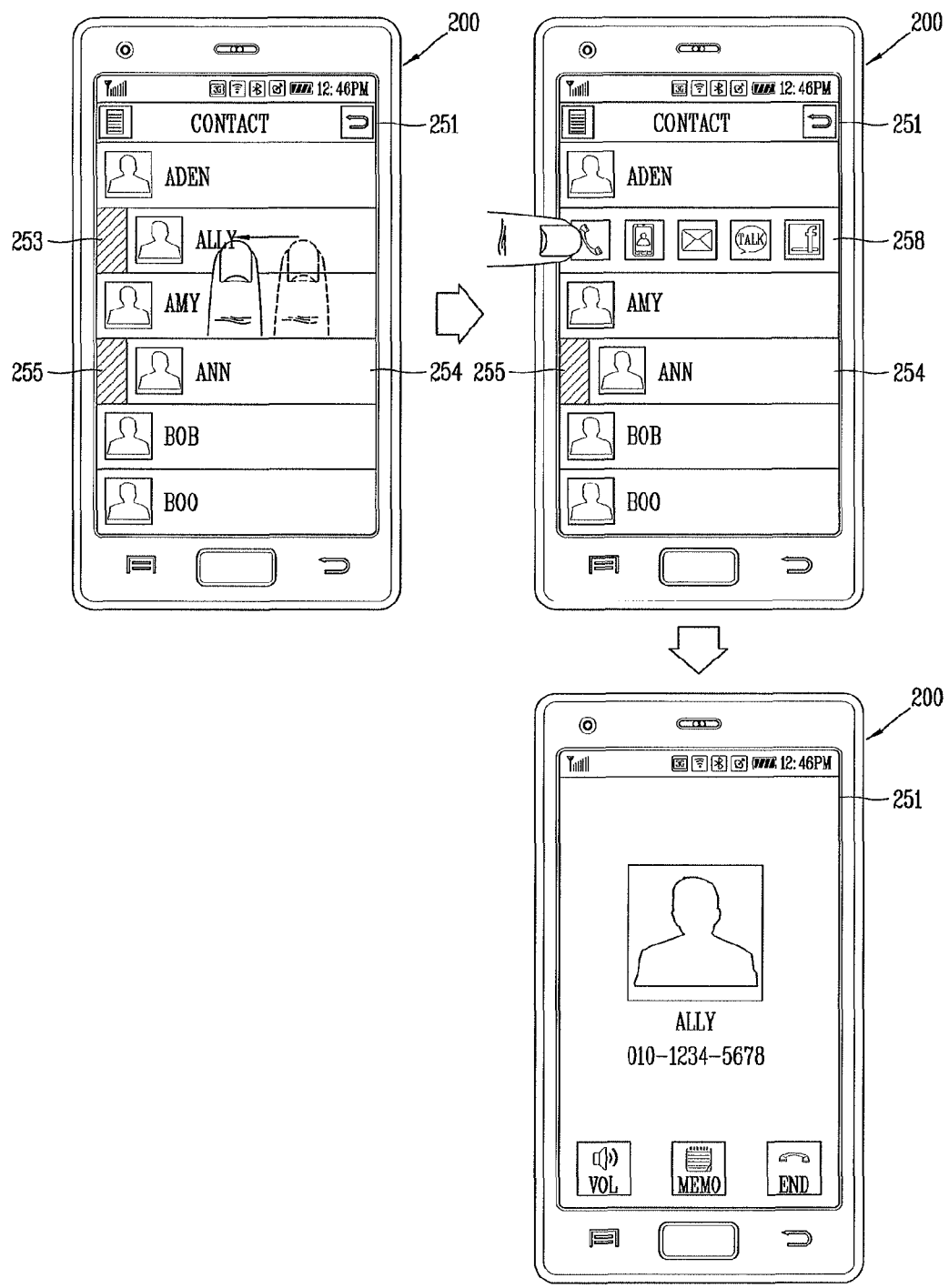

FIGS. 13 and 14 illustrate operational examples of mobile terminals according to FIG. 3. The mobile terminal 200 may include a display unit 251, a grouping unit 182 (See FIG. 1) and a control unit 180 (See FIG. 1). The display unit 251 may display a plurality of objects including contact address information.

In a case where a first touch input for a first object 252 among the plurality of objects, e.g., a first drag input in a first direction is sensed as shown in FIGS. 4 to 6, the grouping unit 182 may group the first object 252 into a group corresponding to attribute information of the first drag input, e.g., a first group.

However, in a case where a second touch input for the object 252, e.g., a second drag input in a second direction is sensed, the control unit 180 may execute at least one of an information correction mode and a delete mode of the object 252, as shown in FIG. 13.

For example, when the information correction mode is executed, the control unit 180 may display, on the display unit 251, a screen 257 on which at least one of a telephone number, an e-mail address, a companion's name corresponding to the objects 252 and a photograph is to be corrected as a contact address.

When the delete mode is executed, the control unit 180 deletes the object 252, and accordingly, the object 252 may disappear on the display unit 251.

Meanwhile, in a case where a third touch input for the object 252, e.g., a third drag input in a third direction is sensed, the control unit 180 may display, on the display unit 251, a plurality of icons 258 respectively corresponding to a plurality of functions related to the object 252, as shown in FIG. 14.

For example, the control unit 180 may display, on the display unit 251, icons 258 respectively corresponding to a telephone communication function, a video communication function, an e-mail transmission/reception function, a message transmission/reception function and an SNS screen display function.

Subsequently, in a case where any one of the icons 258 is selected, the control unit 180 may perform a function corresponding to the selected icon.

For example, in a case where an icon corresponding to the telephone communication function is selected among the icons 258, the control unit 180 may transmit a call signal to a companion corresponding to the object 252. Here, the entire screen on which the plurality of objects are displayed may be converted into a call signal transmission screen as shown in this figure. Alternatively, although not shown in this figure, a portion of the screen on which the plurality of objects are displayed may be converted into the call signal transmission screen. In this case, the region in which the object 252 is displayed on the display unit 251 may be converted into the call signal transmission screen.

Figure 15:
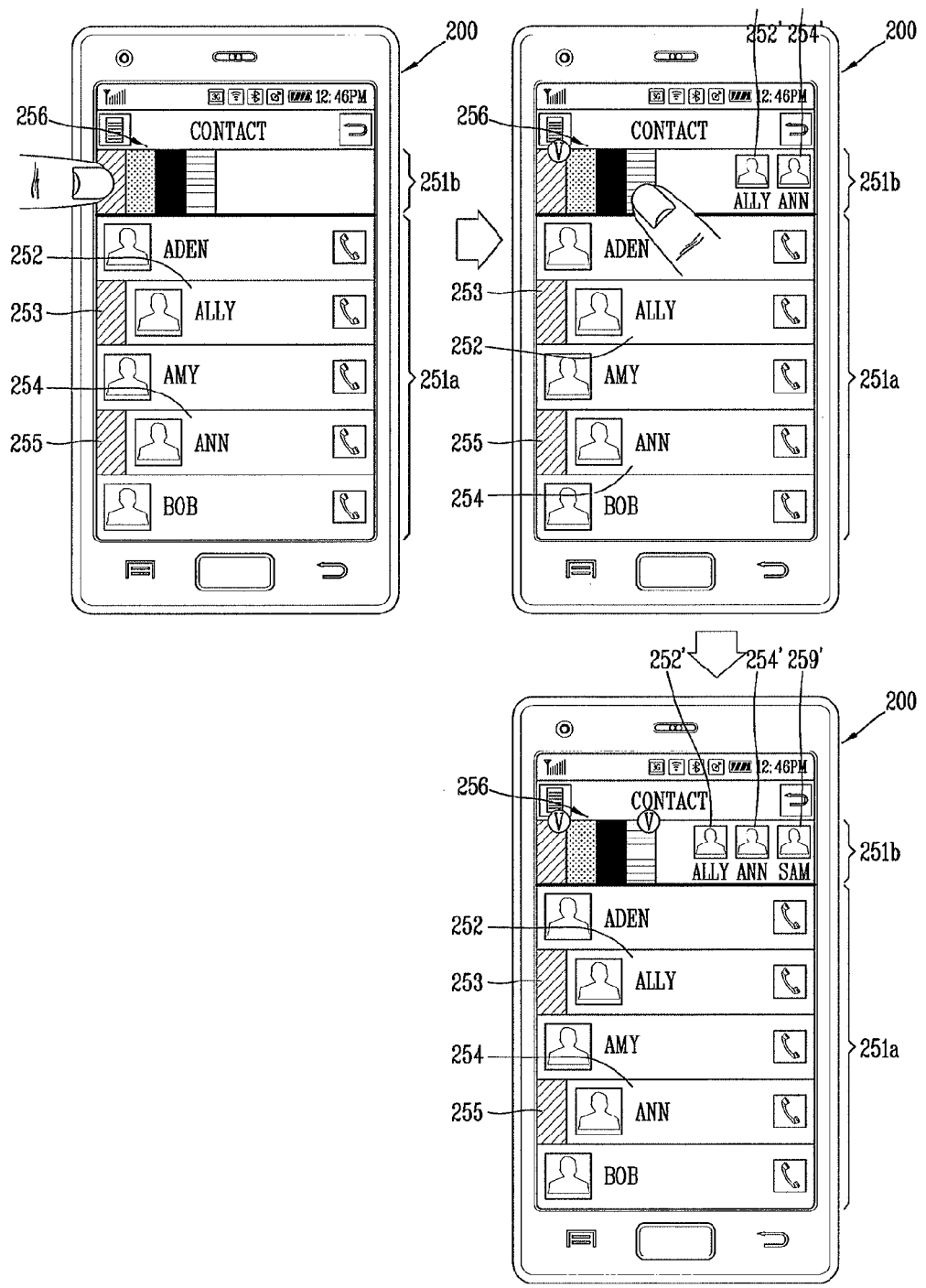

FIG. 15 illustrates operational examples of mobile terminals according to FIG. 3. The mobile terminal 200 may include a display unit 251, a grouping unit 182 (See FIG. 1) and a control unit 180 (See FIG. 1).

Referring to FIG. 15, the display unit 251 may display a plurality of objects including contact address information.

The control unit 180 may generate a control command for performing a function of dividing a screen displayed on the display unit 251 into a plurality of regions (hereinafter, referred to as a 'screen division command'). The control unit 180 may set first and second screen regions 251*a* and 251*b* displayed on the display unit 251, based on the screen division command. As shown in this figure, the first and second screen regions 251*a* and 251*b* may respectively correspond to lower and upper regions generated by dividing the entire screen region of the display unit 251 in the lateral direction.

The bar for dividing the first and second screen regions 251*a* and 251*b* may be selected, based on a touch input applied on the display unit 251. For example, in a case where the bar is dragged in the direction of the second screen region 251*b*, the bar may be moved in the direction of the second screen region 251*b*. Accordingly, the size of the first screen region 251*a* can be enlarged, and simultaneously, the size of the second screen region 251*b* can be reduced.

As shown in this figure, the plurality of objects may be displayed in the first screen region 251*a* that is the lower region generated in the division of the display unit 251. The control unit 180 may display, on the second screen region 251*b*, a plurality of indicators 256 respectively corresponding to a plurality of groups.

In a case where any one of the plurality of indicators 256 is selected, the control unit 180 may extract objects (e.g., first and second objects 252 and 254) included in a group corresponding to the selected indicator, as shown in this figure. Subsequently, the control unit 180 may display, in the second screen region 251*b*, icons 252' and 254' respectively corresponding to the extracted first and second objects 252 and 254. Simultaneously, the control unit 180 may display an icon representing that the indicator has been selected among the plurality of indicators 256.

Similarly, in a case where another of the plurality of indicators 256 is selected, the display unit 180 may extract an object (e.g., an object 259) included in a group corresponding to the selected indicator, and display an icon 259' corresponding to the extracted object 259 in the second screen region 251*b*.

Although not shown in this figure, in a case where any one of the plurality of indicators 256 is selected, the control unit 180 may display objects included in a group corresponding to the selected indicator in the second screen region 251*b*. In this case, the position of the bar for dividing the first and second screen regions 251*a* and 251*b* may be moved according to the number of objects displayed in the second screen region 251*b*.

Figure 16:
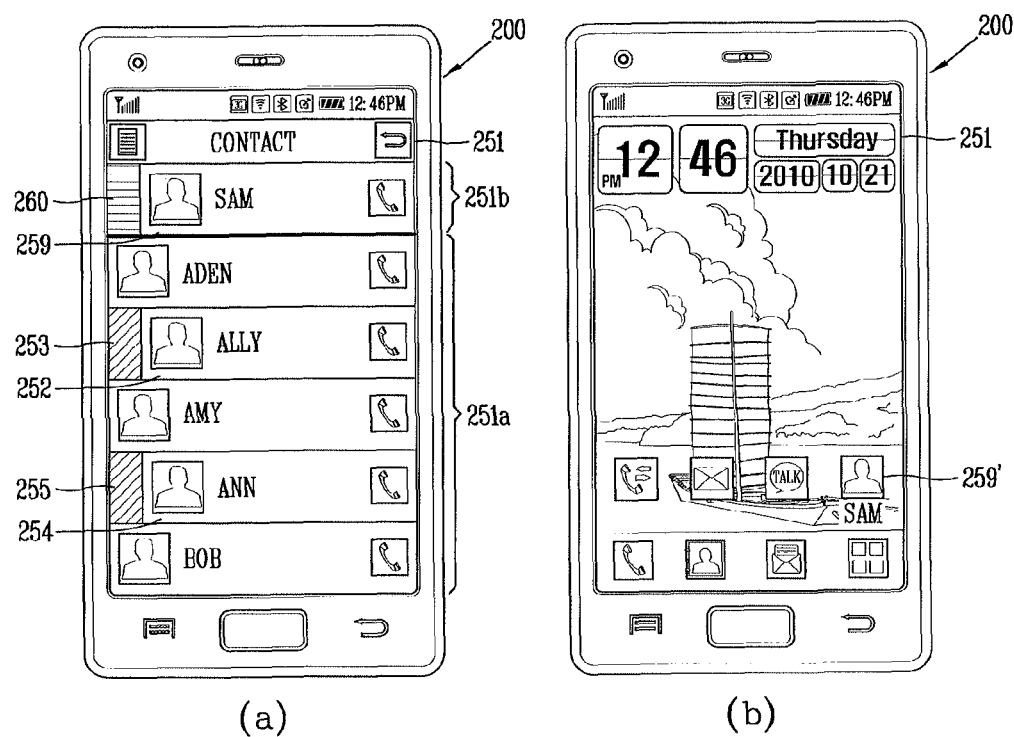

FIG. 16 illustrates operational examples of mobile terminals according to FIG. 3. The mobile terminal 200 may include a display unit 251, a grouping unit 182 (See FIG. 1) and a control unit 180 (See FIG. 1).

Referring to FIG. 16(a), the display unit 251 may display a plurality of objects including contact address information in a first screen region 251a.

The control unit 180 may select some of the plurality of groups, based on priority order information of each of the plurality of groups, and display objects included in the selected groups in a second screen region 251b.

For example, based on priority order information of a first group in which first and second objects 252 and 254 are included and priority order information of a second group in which a third object 259 is included, the control unit 180 may select the second group of which priority order information is higher than that of the first group. Subsequently, the control unit 180 may display the third object 259 included in the second group in the second screen region 251b.

Referring to FIG. 16(b), the control unit 180 may display, on a wall paper, objects included in the selected group or icons respectively corresponding to the objects.

Accordingly, as shown in this figure, an icon 259' corresponding to the third object 259 included in the second group may be displayed on the wall paper. Although not shown in this figure, in a case where a user selects the icon 259' corresponding to the third object 259, information related to the third object 259 may be displayed on the display unit 251.

Figure 17:
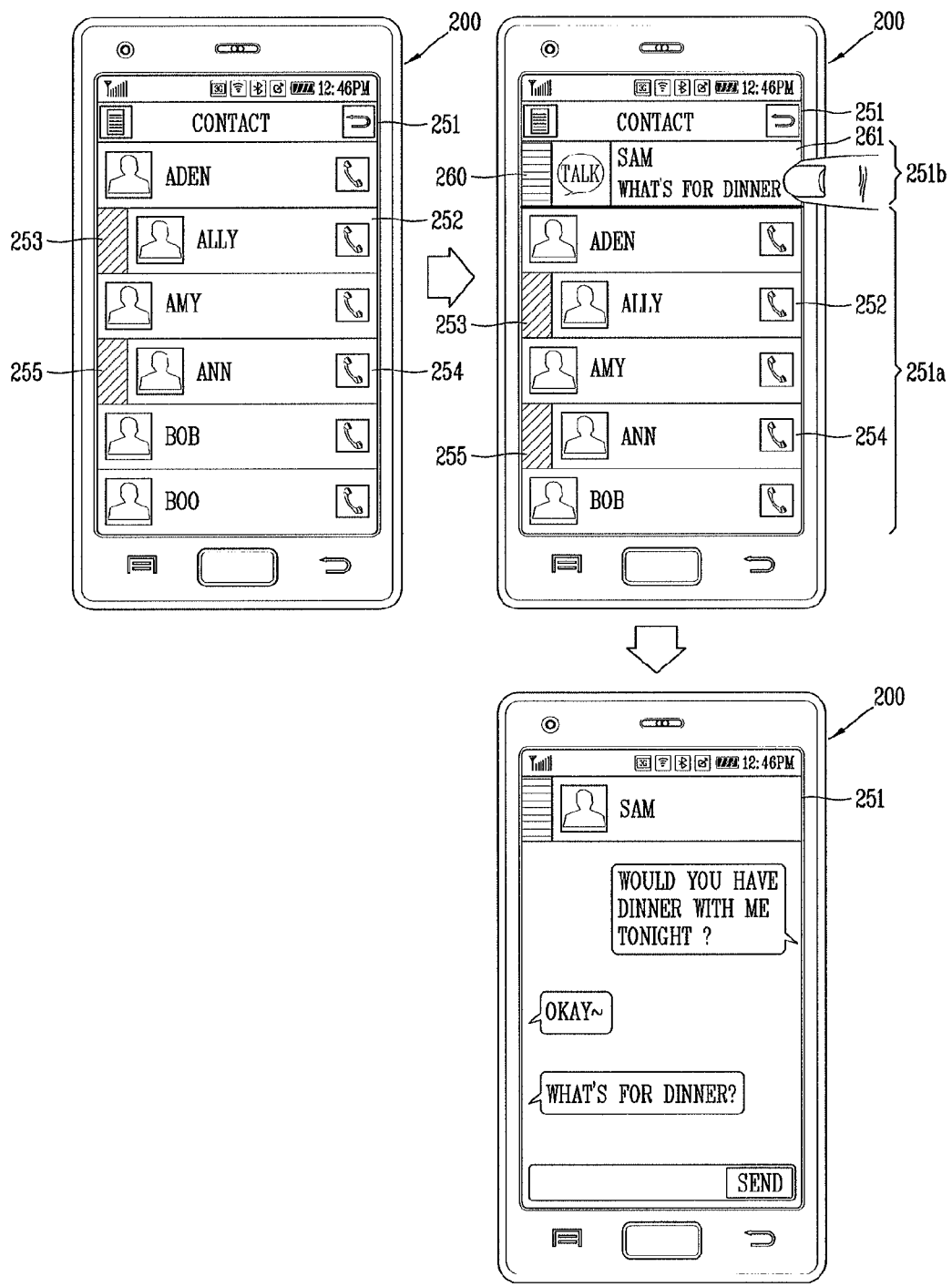

FIG. 17 illustrates operational examples of mobile terminals according to FIG. 3. The mobile terminal 200 may include a display unit 251, a grouping unit 182 (See FIG. 1) and a control unit 180 (See FIG. 1).

Referring to FIG. 17, the display unit 251 may display a plurality of objects including contact address information in a first screen region 251a.

In a case where an event related to any one 259 of the plurality of objects occurs, the control unit 180 may display, in a second screen region 251b, at least one of the object 259 and the information on the occurring event.

For example, in a case where a message is received from a companion corresponding to the object 259, the control unit 180 may display, in the second screen region 251b, information related to the object 259 and information 261 on the received message.

The control unit 180 may display, in the second screen region 251b, at least one of any one object and information on the occurring event for a predetermined time. Although not shown in this figure, when the predetermined time elapses, the second screen region 251b may disappear on the display unit 251.

When a touch input for the information 261 on the received message displayed in the second screen region 251b is sensed, the control unit 180 may display a message transmission/reception screen on the display unit 251, as shown in this figure.

Although not shown in this figure, an object that requires an 'alarm' function may be displayed in the second screen region 251b. In this case, after the time at which the alarm is released elapses, the second screen region 251b may disappear on the display unit 251.

For example, in a case where a user sets the alarm so that a call signal is transmitted to a companion at a predetermined time, after the predetermined time elapses or although the predetermined time does not elapses, the second screen region 251b may disappear on the display unit 251 after the user transmits the call signal to the companion.

Furthermore, according to an embodiment of present disclosure, the foregoing method may be implemented as codes readable by a processor on a medium written by a program. Examples of the processor-readable media may include ROM, RAM, CD-ROM, magnetic tape, floppy disk, and optical data storage device, and the like, and also include a device implemented in the form of a carrier wave (for example, transmission via the Internet).

The configurations and methods according to the above-described embodiments will not be applicable in a limited way to the foregoing mobile terminal, and all or part of each embodiment may be selectively combined and configured to make various modifications thereto.

What is claimed is:

1. A mobile terminal, comprising:
a display configured to enable a touch input thereon; and
a controller configured to:
display a plurality of objects on a first region of the display;
when a first touch input for a first object displayed on the display is sensed, detect a first attribute information of the first touch input, group the first object into a first group based on the first attribute information, and display a first indicator indicating that the first object has been grouped into the first group corresponding to the first attribute information on the first region together with the first object;
when a second touch input for a second object which is different from the first touch input for the second object is sensed, detect a second attribute information of the second touch input, group the second object into a second group which is different from the first group and corresponds to the second attribute information, and display a second indicator which is different from the first indicator to indicate that the second object has been grouped into the second group with the second object;
receive a screen division command to display the plurality of objects in the first screen region and to display a plurality of indicators in a second screen region including the first indicator and the second indicator; and
display all objects belonging to the first group in the second region when a touch input for the first indicator displayed in the second region is subsequently sensed and display all objects belonging to the second group in the second region when a touch input for the second indicator displayed in the second region is subsequently sensed.

2. The mobile terminal of claim 1, wherein the controller detects a degree of the first touch input applied as the first attribute information of the first touch input, and the degree of the first touch input applied includes at least one of a change in touch operation and a maintenance time of the touch operation from a start to a release of the first touch input.

3. The mobile terminal of claim 2, wherein, when the start of the first touch input is sensed, the controller displays one or more different indicators on the display according to the degree of the first touch input applied, and groups the touched object into the first group upon the release of the first touch input.

4. The mobile terminal of claim 2, wherein when a third touch input for the touched object is sensed, the controller executes at least one of an information correction mode and a delete mode of the touched object.

5. The mobile terminal of claim 1, wherein, when a third touch input for the touched object is sensed, the controller displays, on the display unit, a plurality of icons respectively corresponding to a plurality of functions related to the touched object, and when any one of the icons is selected, the controller performs a function corresponding to the selected icon.

6. The mobile terminal of claim 1, wherein, when a third touch input for the grouped object is sensed, the controller releases the grouping of the object or changes the group in which the object is included into another group.

7. The mobile terminal of claim 1, wherein the controller selects some of the plurality of groups, based on priority order information of each of the plurality of groups, and displays objects included in the selected groups in the second screen region.

8. The mobile terminal of claim 7, wherein the controller displays the objects included in the selected groups on a wall paper.

9. The mobile terminal of claim 1, wherein, when an event related to any one of the plurality of objects occurs, the controller displays, in the second screen region, at least one of the plurality of objects and information on the occurring event.

10. The mobile terminal of claim 9, wherein the controller displays at least one of the plurality of objects and the information on the occurring event in the second screen region for a predetermined time, and when the predetermined time elapses, the second screen region disappears from the display unit.

11. The mobile terminal of claim 1, wherein the controller displays the first indicator on the object or displays the first indicator in a place adjacent to the object.

12. The mobile terminal of claim 11, wherein the first indicator includes an icon having a color corresponding to the first group.

13. The mobile terminal of claim 12, wherein the controller changes at least one of the color, shape and size of the first indicator, based on the touch input for the first indicator.

14. A control method for a mobile terminal including a display on which a touch input is possible, the control method comprising:
 displaying a plurality of objects on a first region of the display;
 when a first touch input applied to a first object displayed on the display unit is sensed, detecting a first attribute information of the sensed first touch input;
 grouping the first object into a first group based on the detected first attribute information;
 displaying, a first indicator indicating that the touched first object has been grouped into the first group corresponding to the detected first attribute information on the first region together with the first object;
 when a second touch input for a second object which is different from the first touch input for the second object is sensed, detecting a second attribute information of the second touch input;
 grouping the second object into a second group which is different from the first group and corresponds to the second attribute information;
 displaying a second indicator which is different from the first indicator to indicate that the second object has been grouped into the second group with the second object;
 receiving a screen division command to display the plurality of objects in the first screen region and to display a plurality of indicators in a second screen region including the first indicator and the second indicator; and
 displaying, on a region of the display, all objects belonging to the first group in the second region when a touch input for the first indicator displayed in the second region is subsequently sensed and display all objects belonging to the second group in the second region when a touch input for the second indicator displayed in the second region is subsequently sensed.

15. The control method of claim 14, wherein the detecting of the first attribute information of the sensed first touch input includes detecting a degree of the first touch input applied as the first attribute information of the first touch input, and the degree of the first touch input applied includes at least one of a change in touch operation and a maintenance time of the touch operation from a start to a release of the first touch input.

16. The control method of claim 15, wherein the grouping of the touched object into the first group corresponding to the detected first attribute information includes:
 when the start of the first touch input is sensed, displaying one or more different indicators on the display unit according to the degree of the first touch input applied; and
 grouping the touched object into the first group upon the release of the first touch input.

* * * * *